(12) United States Patent
Terekhov et al.

(10) Patent No.: US 12,494,062 B2
(45) Date of Patent: Dec. 9, 2025

(54) WEAPON TRACKING SECURITY METHOD, STORAGE MEDIUM, AND DEVICE

(71) Applicant: UNIFAI HOLDINGS LIMITED, London (GB)

(72) Inventors: Vladislav Terekhov, London (GB); Ilya Romanenko, London (GB)

(73) Assignee: UNIFAI HOLDINGS LIMITED, London (GB)

( * ) Notice: Subject to any disclaimer, the term of this patent is extended or adjusted under 35 U.S.C. 154(b) by 0 days.

(21) Appl. No.: 15/745,148

(22) PCT Filed: Jul. 14, 2016

(86) PCT No.: PCT/GB2016/052128
§ 371 (c)(1),
(2) Date: Jan. 16, 2018

(87) PCT Pub. No.: WO2017/009649
PCT Pub. Date: Jan. 19, 2017

(65) Prior Publication Data
US 2018/0218515 A1    Aug. 2, 2018

(30) Foreign Application Priority Data

Jul. 14, 2015 (GB) .................................... 1512283

(51) Int. Cl.
*G06V 20/52* (2022.01)
*G06T 7/70* (2017.01)
(Continued)

(52) U.S. Cl.
CPC ............... *G06V 20/52* (2022.01); *G06T 7/70* (2017.01); *G06V 10/24* (2022.01); *G06V 20/40* (2022.01);
(Continued)

(58) Field of Classification Search
CPC ....... G06K 2009/3291; G06K 9/00369; G06K 9/00711; G06K 9/00771; G06K 9/32;
(Continued)

(56) References Cited

U.S. PATENT DOCUMENTS 7,006,950 B1 *  2/2006  Greiffenhagen ............................ G08B 13/19647 703/2
7,961,174 B1 *  6/2011  Markovic ............. A63F 13/428 345/158
(Continued)

FOREIGN PATENT DOCUMENTS

EP      2 790 152 A1    10/2014
GB      2 447 133 A      9/2008
(Continued)

OTHER PUBLICATIONS

Grifoni, P. "Multimodal Human Computer Interaction and Pervasive Services," Multimodal Human Computer Interaction and Pervasive Services, p. 207, (Jan. 1, 2009) XP055307048.
(Continued)

*Primary Examiner* — Kenny A Cese
(74) *Attorney, Agent, or Firm* — Saul Ewing LLP

(57) ABSTRACT

A computer vision process in which (i) a track record for one or more detected objects is created, the track record defining metadata or parameters for that detected object; and (ii) that track record is then linked to one or more higher-level track records for one or more higher-level objects.

38 Claims, 21 Drawing Sheets

(51) Int. Cl.
*G06V 10/24* (2022.01)
*G06V 10/62* (2022.01)
*G06V 20/40* (2022.01)
*G06V 40/10* (2022.01)

(52) U.S. Cl.
CPC .. *G06V 40/103* (2022.01); *G06T 2207/10016* (2013.01); *G06T 2207/30196* (2013.01); *G06V 10/62* (2022.01)

(58) Field of Classification Search
CPC ........... G06K 9/00389; G06K 9/00664; G06K 2009/00738; G06K 9/00335; G06K 9/00355; G06K 9/00718; G06K 9/3216; G06K 9/3241; G06T 2207/10016; G06T 2207/30196; G06T 7/70; G06T 2207/30241; G06F 3/017; G06V 20/52; G06V 10/24; G06V 20/40; G06V 40/103; G06V 10/62
USPC .......................................................... 382/103
See application file for complete search history.

(56) References Cited

U.S. PATENT DOCUMENTS

| | | | | |
|---|---|---|---|---|
| 8,115,814 | B2* | 2/2012 | Iwase ................ | H04N 5/23203 348/169 |
| 8,649,594 | B1* | 2/2014 | Hua ...................... | G06V 20/52 706/14 |
| 9,786,059 | B2* | 10/2017 | Ruf ........................ | G06T 7/20 |
| 2004/0120581 | A1 | 6/2004 | Ozer et al. | |
| 2006/0187305 | A1* | 8/2006 | Trivedi ................. | G06T 7/292 348/169 |
| 2007/0182818 | A1* | 8/2007 | Buehler ........... | G08B 13/19608 348/143 |
| 2008/0018738 | A1* | 1/2008 | Lipton ................... | G06V 20/52 348/E7.087 |
| 2008/0159590 | A1 | 7/2008 | Yi et al. | |
| 2009/0016599 | A1* | 1/2009 | Eaton ..................... | G06N 3/044 382/159 |
| 2009/0087027 | A1* | 4/2009 | Eaton ..................... | G06F 15/16 382/103 |
| 2010/0027892 | A1* | 2/2010 | Guan .................. | G06V 10/7515 382/203 |
| 2012/0105267 | A1* | 5/2012 | DeLia ................... | G06V 10/36 378/70 |
| 2014/0067121 | A1* | 3/2014 | Brooks ................. | B25J 9/1676 700/255 |
| 2014/0244004 | A1* | 8/2014 | Scott ................. | G05B 19/4061 700/56 |
| 2014/0266860 | A1* | 9/2014 | Blumrosen ............. | G01S 15/89 367/87 |
| 2014/0347475 | A1* | 11/2014 | Divakaran ............. | G06V 20/52 348/135 |
| 2015/0019161 | A1* | 1/2015 | Moriguchi ............ | G01S 5/0294 702/150 |
| 2017/0344832 | A1* | 11/2017 | Leung ................ | G06K 9/00342 |

FOREIGN PATENT DOCUMENTS

| | | | |
|---|---|---|---|
| GB | 2 528 330 A | 1/2016 | |
| WO | WO-2015014822 A1 * | 2/2015 | ............... G06T 7/20 |

OTHER PUBLICATIONS

Kompatsiaris, Y., "Semantic Multimedia and Ontologies Theory and Applications," Semantic Multimedia and Ontologies Theory and Applications, p. 19, (Jan. 1, 2008) XP055307051.

Moeslund, T., "Visual Analysis of Humans," Visual Analysis of Humans, pp. 186-187 (Jan. 1, 2011) XP055307059.

Wang, L., "Machine Learning for Vision-Based Motion Analysis," Machine Learning for Vision-Based Motion Analysis, pp. 227, 241 (Jan. 1, 2011) XP055307136.

Salah, A., "Computer Analysis of Human Behavior," Computer Analysis of Human Behavior, pp. 42-45, 54-56, 59-61 (Jan. 1, 2011) XP055307140.

International Search Report, dated Oct. 11, 2016, and Written Opinion, issued in priority international Application No. PCT/GB2016/052128.

Combined Search and Examination Report, dated Jan. 18, 2017, issued in GB Application No. GB 1612226.9.

* cited by examiner $$D\max = W_{face} * x \quad (1)$$

$$Ratio = \frac{H_{face}}{H_{hand}} \quad (2)$$

$$L = \sqrt{\left(x_{end} - x_{start}\right)^2 + \left(y_{end} - y_{start}\right)^2} \quad (3)$$

$$Ratio = \frac{L}{TR_h} \quad (4)$$

FIGURE 20

$$Ratio = abs\left(\frac{H_c - H_p}{H_c}\right) \quad (5)$$

$$Ratio = abs\left(\frac{A_c - A_p}{A_c}\right) \quad (6)$$

$$Ratio = \frac{H_{FF-HS}}{H_{HS-FACE}} \quad (7)$$

$$D_{maximum} = \frac{H_{ff-hs}}{x} \quad (8)$$

FIGURE 21

WEAPON TRACKING SECURITY METHOD, STORAGE MEDIUM, AND DEVICE

CROSS REFERENCE TO RELATED APPLICATIONS

This application claims the priority of PCT/GB2016/052128, filed on Jul. 14, 2016, which claims priority to GB Application No. GB1512283.1, filed on Jul. 14, 2015, the entire contents of each of which being fully incorporated herein by reference.

BACKGROUND OF THE INVENTION

1. Field of the Invention

The field of the invention relates to a computer vision process in which video and image analysis is used to detect and track objects and to generate events that are associated with changes in the objects, such as changes in the objects' presence, trajectory or pose.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Technical Background

The ability to understand people's presence and behaviours offers a plethora of applications in a wide range of domain such as in home automation, computer games, surveillance, security, marketing or commercial environments.

Examples of earlier systems are video motion or change detectors that trigger a connected device such as an alarm or activate a recording. Recent popular techniques employ motion segmentation, which segment foreground objects from a background scene at each frame. Groups of objects with the same motion orientation are analysed. Other techniques are based on machine learning techniques such as Convolutional Neural Networks (CNN). However such techniques involve training a system with a large number of examples based on the objects that the system needs to analyse.

Some of the drawbacks of these techniques are that they are computationally intensive and that they also require a human operator.

Computer vision systems should ideally be able to monitor, understand as well as infer or predict human behaviour accurately and in real-time, as well as guarantee privacy. These are technically very challenging.

The following disclosures are incorporated by reference: US2016/0019426 and PCT/GB2016/050201.

3. Discussion of Related Art

The prior art of object detection, tracking, and event generation is broad and deep. Reference may be made to U.S. Pat. Nos. 5,969,755 A, 6,628,835 B1, 6,823,011 B2, 6,833,849 B1, 7,088,846 B2, 7,110,569 B2, 7,127,083 B2, 7,136,507 B2, 7,148,912 B2, 7,199,798 B1, 7,200,266 B2, 7,263,472 B2, 7,369,680 B2, 7,376,244 B2, 7,468,662 B2, 7,499,571 B1, 7,796,029 B2, 8,063,764 B1, 8,195,598 B2, 8,284,258 B1, 8,478,048 B2, 8,548,203 B2, 8,553,778 B2, 8,564,661 B2, 8,620,022 B2, 8,761,451 B2, 8,797,403 B2, US 20040086152 A1 US 20050285937 A1, US 20090310855 A1, US 20100026802 A1, and US 20120114176 A1.

U.S. Pat. No. 5,969,755A for example discloses a method for providing automatic content-based video indexing from object motion. The method detects moving objects captured from a surveillance camera using motion segmentation.

U.S. Pat. No. 6,823,011B2 for example discloses a method for detecting an unusual event in a video. The method extracts motion vectors from each frame in a video acquired by a camera of a scene.

SUMMARY OF THE INVENTION

The invention is a computer vision process in which (i) a track record for one or more detected objects is created, the track record defining metadata or parameters for that detected object; and (ii) that track record is then linked to one or more higher-level track records for one or more higher-level objects.

Optional features include the following:
track records are dynamically created and hierarchically organised: higher level track records are a hierarchical organisation of simpler track records and the hierarchical organisation is created in real-time
a track record for an object is a per-object record of events relating to that object and can include data for the presence, trajectory, pose, gesture or identity of that object. A track record may be a re-formatting of real-time metadata.
the track record is stored in a MySQL-type database, correlated with a video database.
a track record for an object enables information about that object to be inferred from a track record of a second object; that first track record can be a higher-level track record or at the same level as the track record for the second object. For instance, if you know the trajectory of a torso, then you also know the trajectory of a head that belongs to the same body as that torso).
where a first object has a known size or shape, then information about the size or shape of a second object can be inferred from the track record of the object. For example, if you know the size of a head, then you make a reasonably accurate assumption about the size of the torso for that head. Where the object is a car, or other object of generally known dimension(s), then information about the height of a person near the car or other object can be inferred from the track record of the object.
Where the object has a known relationship to a second object, then information about the presence of that object can be inferred from the presence of the second object. For example, if a head is detected, and a torso is also detected nearby, then they are likely to be related and can be linked in a new track record for a single body.
Optional features relating to hierarchical track records, and hence also hierarchical objects, include the following:
a link between an object and a higher-level object, or their respective track records, is established when the probability that a detected object is associated with the higher-level object exceeds a threshold
the probably is a function of one or more of: proximity; position, movement, trajectory, length, area, volume, angular position, colour, temperature e.g. heads and hands are linked to define a single higher level object—a person—if they are sufficiently close, or move in a consistent manner—ie are likely to belong to the same person a track record for one or more higher-level object is linked to one or more track records for further higher-level objects empty slots in a higher-level track record for a higher-level object are reserved to establish links to detected objects in a lower-level track record empty slots in a higher-level track record for a higher-level object are reserved to establish links to lower-level objects or objects at the same level number of links in a track record is predetermined number of links in a track record can adaptively change over time if a higher-level track record for a higher level object has an empty slot for a specific kind of object, then the system searches for detected objects that are candidates to be linked to that empty slot if one detected object disappears, but the associated higher level object is still being tracked, then if that object is re-detected, it can be rapidly re-associated with that higher-level object a higher-level track record is created if the track records for several objects share sufficiently similar or otherwise related parameters if the trajectory or pose of several humans, as defined in a track record for each human, is sufficiently similar, then a track record for a group consisting of those humans, is automatically created examples of detected objects include: face, hands, head & shoulders, full figure, cars, other specific kinds of object examples of higher-level objects include: a human; a human that is identified or named; a human that is classified as belonging to a specific category; a human plus a specific kind of object; a human plus a specific kind of environment; a group of humans; a group of humans identified or named; a group of humans classified as belonging to a specific category; a group of human beings plus a specific kind of object; a group of human beings plus a specific kind of environment; any relationship between one or more humans, or parts of humans, and one or more objects; any relationship between one or more humans, or parts of humans, and one or more environments; any object which is linked to another object.

Optional features relating to events include the following:

a track record for an object includes events or activities related to that object an event is a set of data that represents activity an event is linked to a specific moment, or a specific time period, or a specific sequence of video frames an event is dynamically created events are hierarchically organised and the hierarchical organisation is created in real-time an event is created when a new track record is made an event is created when a new track record is made for a higher-level object because one or more track records for lower level objects are created an event is created when a track record is linked to a higher level track record an event for an object is automatically created when a link to or from the object is established or broken an event is created when an object is static an event is created when there is a change in the presence, trajectory, pose, gesture or other parameter in a track record an event is created when a change in the area of an object is detected an event is created when movement of an object is detected an example of an event is motion, which is defined by one or more of the following parameters: motion value; direction of motion; angle of motion an example of an event is an area change, which is defined by one or more of the following parameters: value of new area; change on value of the area the track record includes one or more complex events, which are each formed from an analysis of simpler events a complex event is formed from a sequence of simpler events complex events are a hierarchical organisation of simpler events complex events are dynamically created in real-time and are not predetermined a sequence of area change events for a detected object is interpreted as the complex event of the object approaching or leaving.

complex events define gestures to which meaning is attributed complex events describe, classify or infer a person's behaviour or intent or needs Optional features relating to various use cases include the following:

the computer vision process is used to implement gesture-based control the computer vision process is used to implement motion detection the computer vision process is used to enhance a voice recognition system by preventing the voice recognition system from acting on voice instructions unless a user is looking at or towards a sensor the computer vision process is used to control a HVAC (heating, ventilation and air conditioning) system the computer vision process is used to control a smart home or office or other environment the computer vision process is used to control evacuation of a building the computer vision process is used to monitor people approaching and leaving defined areas, such as retail environments, or specific areas within a retail environment, or high-security or dangerous areas the computer vision process is used to identify a person holding a gun or other weapon the computer vision process is used to identify and track a person abandoning a bag or other object the computer vision process is used to monitor the behavior of one or more persons the computer vision process is used to monitor theft of any object(s) by one or more persons.

the computer vision process is used to infer the intent of one or more persons. A machine readable instruction can then be sent, depending on the intent that has been inferred. For example, if a person has picked up some items from a retail store and is heading to the exit door, then an intent to steal can be inferred and an appropriate signal sent to the store security. If a person looks at a sensor and gestures or speaks a command, then an intent to control via the sensor can be inferred and the sensor can be programmed to process that command.

the computer vision process is used to infer the needs of one or more persons. A machine readable instruction can then be sent, depending on the need that has been inferred. For example, if a person is detected lying motionless on their sitting room floor, or lying down but waving their arms, then the need for assistance can be inferred and an appropriate help request sent out.

the computer vision process outputs no video or still images for display on a monitor or screen and from which an individual can be identified. The identity or specific appearance of a person can instead be obfuscated, for example being replaced by a generic avatar.

Optional features relating to the localization or implementation include the following:

the computer vision process is implemented by a computer vision engine localized in a sensor or SoC or GPU.

the computer vision process is implemented by a computer vision engine localised in a camera or other device including a sensor, or in a hub or gateway connected to that device, or in a remote server, or distributed across any permutation of these.

the computer vision process is implemented by a computer vision engine that is localised in one or more of the following: (a) an edge layer that processes raw sensor data; (b) an aggregation layer that provides high level analytics by aggregating and processing data from the edge layer in the temporal and spatial domains; (c) a service layer that handles all connectivity to one or more system controllers and to the end customers for configuration of their home systems and the collection and analysis of the data produced.

Any of the optional features listed above may be combined with any other optional features.

Other aspects of the invention include the following:

A sensor that includes an embedded computer-vision engine that implements the above processes.

An appliance that includes a sensor that in turn includes an embedded computer-vision engine that implements the above processes.

A sensor programmed to provide data to an upstream application or process, that data defining one or more of: Specific objects or object features to detect; the maximum or minimum number of detections; the number of links per object; specific links between different objects (human or non-human); event (basic or complex) to understand/detect such as a specific trajectory, pose or gesture.

A smart home or office system or other physical or logical environment including one or more computer-vision systems A networked system including multiple computer-vision systems as defined above.

Chip-level firmware (e.g. GPU-based) that provides a computer vision engine as defined above.

A computer vision engine as defined above, when embedded in one of the following products: camera; cloud camera; smart door bell; light switch; garage entry system; non-camera sensor based system; fire alarm sensor or alarm; TV; thermostat; coffee machine; light bulb; music steaming device; fridge; oven; microwave cooker; washing machine; any smart device; any wearable computing device; any IoT device; smartwatch; smartphone; tablet; any portable computing device.

BRIEF DESCRIPTION OF THE FIGURES

Aspects of the invention will now be described, by way of example(s), with reference to the following Figures, which each show features of the invention:

FIG. 20 shows formulae referred to elsewhere in this document.

FIG. 21 shows formulae referred to elsewhere in this document.

DETAILED DESCRIPTION

Figure 1:
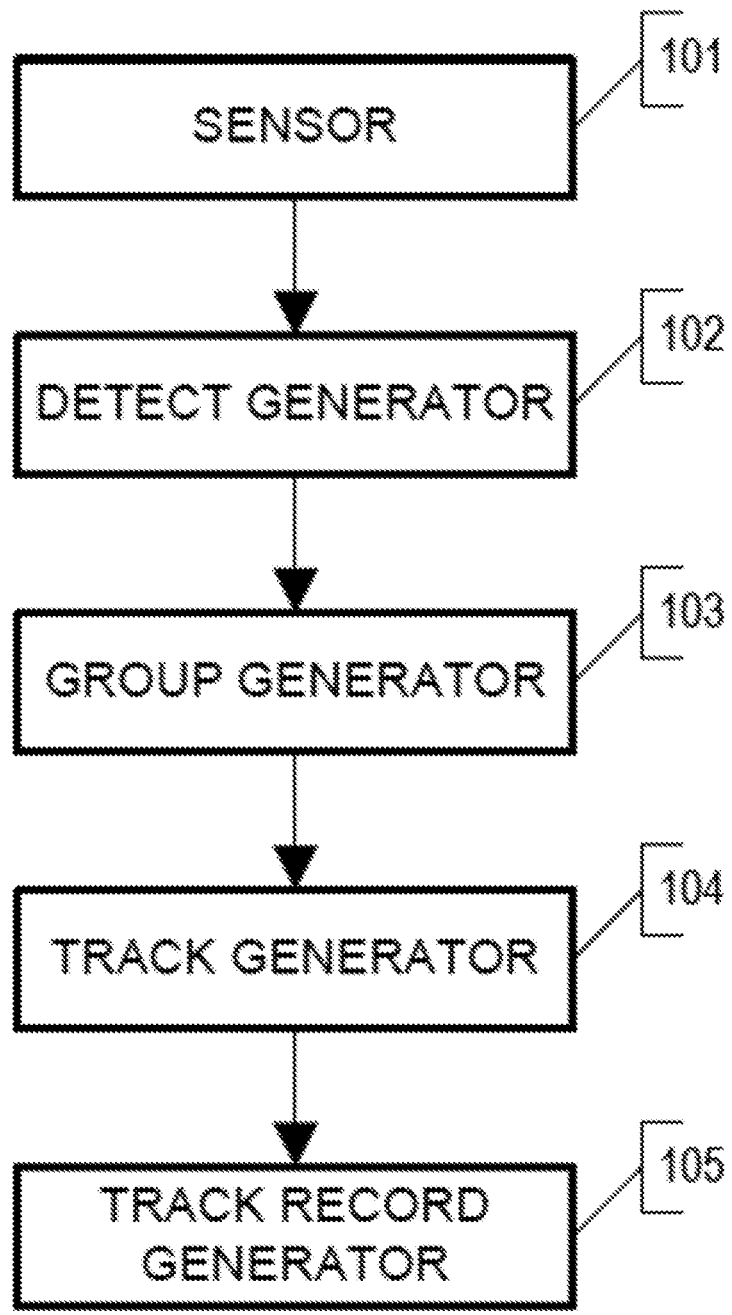
FIG. 1 is a flow diagram illustrating a procedure for generating a track record.

A method is provided for analysing a captured image from a scene from one or several image sensors. A detection algorithm is applied to the image in order to detect one or several objects and/or one or several object features. A grouping algorithm is then applied in order to group the one or several detections (or 'detects') into a group or a cluster. A tracking algorithm is then used to track the detections or group of detections and to generate one or several 'Track Records', wherein a 'Track Record' (TR) represents one or several events based on the behaviour of the detections or group of detections.

Optional features may include the following, each of which can be combined with any other optional feature:

Human and/or non-human objects or features may be detected and analysed.

Human features may include one or more of the following: face, head, head and shoulders, full figure, eyes, lips, ears and hands.

A TR per detected object within a captured image of a scene from one or several sensors is generated.

A TR may be linked to another TR, 'detect' or group of 'detects'.

Links between TRs may be established when a predetermined condition has been met.

One or more of the following may be recorded within a TR: trajectory, acceleration, pose, gesture, appearance, disappearance, and identity.

A wide range of behaviour may be understood, such as for example counting the number of objects, determining the object trajectory, understanding specific movement such as specific gestures.

A detected object is continuously analysed and tracked in real-time.

The algorithms are able to interpret one or more behaviours as either basic or complex events.

One or several image sensors may be used to survey a scene. The sensors may include one or more of the following sensors: sensors operating in the visible spectra, sensors operating in infra red spectra, thermal sensors, ultra sonic sensors, sensors operating in non visible spectra and sensors for acceleration or movement detection.

The behaviour of people within an environment may be understood and represented in a detailed and machine-readable form.

The method is achieved without the need to generate video or still imagery.

Events may be pushed into any smart or connected devices as specific commands.

Events may be detected and/or created as a function of time; example of events may be one or a combination of the following: "human", "approaching", "leaving", "falling", "appearing", "disappearing", "crouching", etc.

An event may describe a track activity. The track activity may include parameters such as motion, rotation, area, angle or volume change The method is performed in real-time and without requiring calibration.

There are a number of parameters that may be predetermined or preprogrammed within an image sensor module depending on a specific upstream application or process such as, but not limited to:

Specific objects or object features to detect;
maximum or minimum number of detections;
number of links per object;
specific links between different objects (human or non-human);
event (basic or complex) to understand/detect a specific trajectory, pose or gesture.

FIG. 1 shows a flow diagram with an example of the procedure for generating a track record. One or several image sensors 101 may capture an image or a set of images from a scene. A data analytics block 102 (or 'detect generator') is used to analyse the image. The data analytics is an extended block. One purpose of the data analytics is for image analysis and the detection of particular features or elements. The block 103 performs a 'group generator' function, which may combine several detects into one or several groups. The group generator is an extended block. The 'track generator' 104 tracks 'detects' or 'group of detects' over time. The 'track generator' is an extended block. The 'track record generator' 105 may analyse 'tracks', 'detects' and 'groups of detects' based on a set of predefined or adaptive rules. The output of the analysis may comprise events and track records. An event is a set of data, which may represent the activity of a track, group or detection for a specific moment in time or specific time period or specific set of time frames. The track record may also hold information about events, so that it is in effect a container for events, and may also include information about other track record(s).

Figure 2:
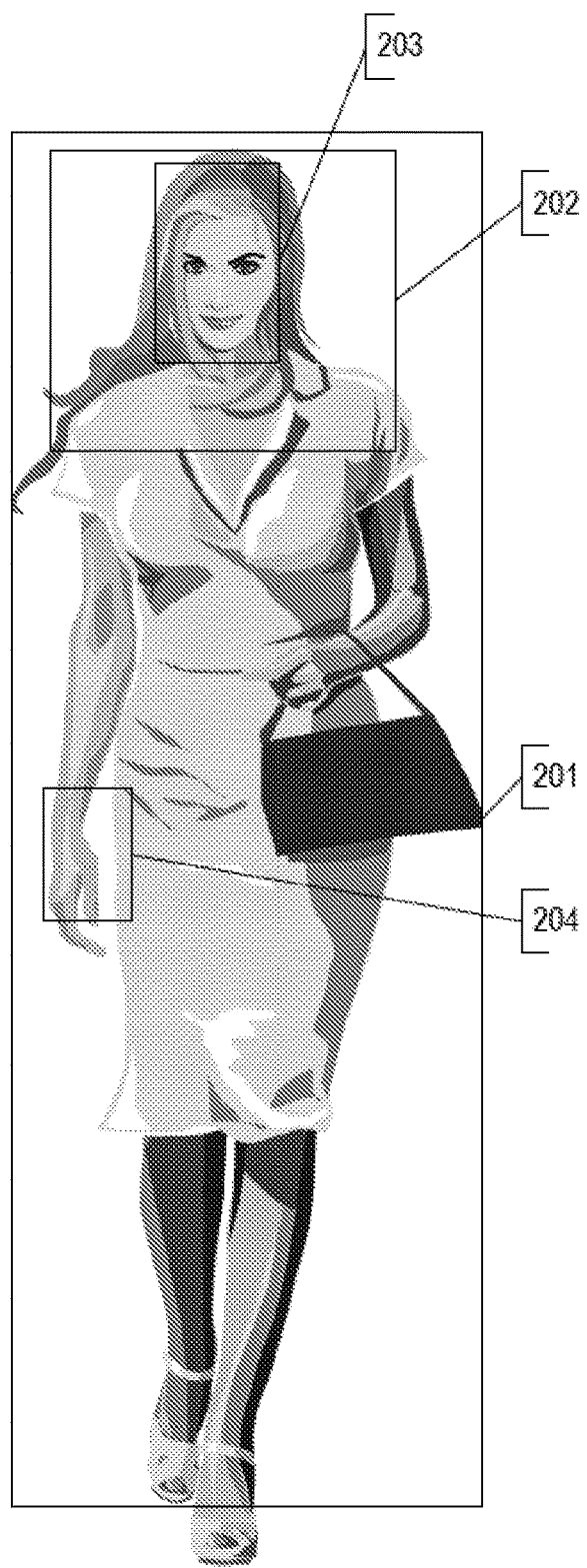
FIG. 2 is an image illustrating human elements (an 'element' is any sort of detected feature), and elements created by either data analytics or 'element parameters' processing.

FIG. 2 is an image illustrating human elements (an 'element' is any sort of detected feature), and elements created by either data analytics or 'element parameters' processing. It shows detection and tracking based on recognising specific parts of the human body. These detected body features may include for example the face 203, the head and shoulders 202, the full FIG. 201 and the hands 204. The detected features may have the following metrics: size, angle, type, colour information, temperature and position. These metrics may have two dimensional space (2D) parameters and/or three dimensional space (3D) parameters. A detected feature may also be referred to as an "element". "Element parameters" may have 2D or 3D parameters that define or relate to the face 102, or head, shoulders 101, full figure, eye, lips, ears and hands.

Figure 3:
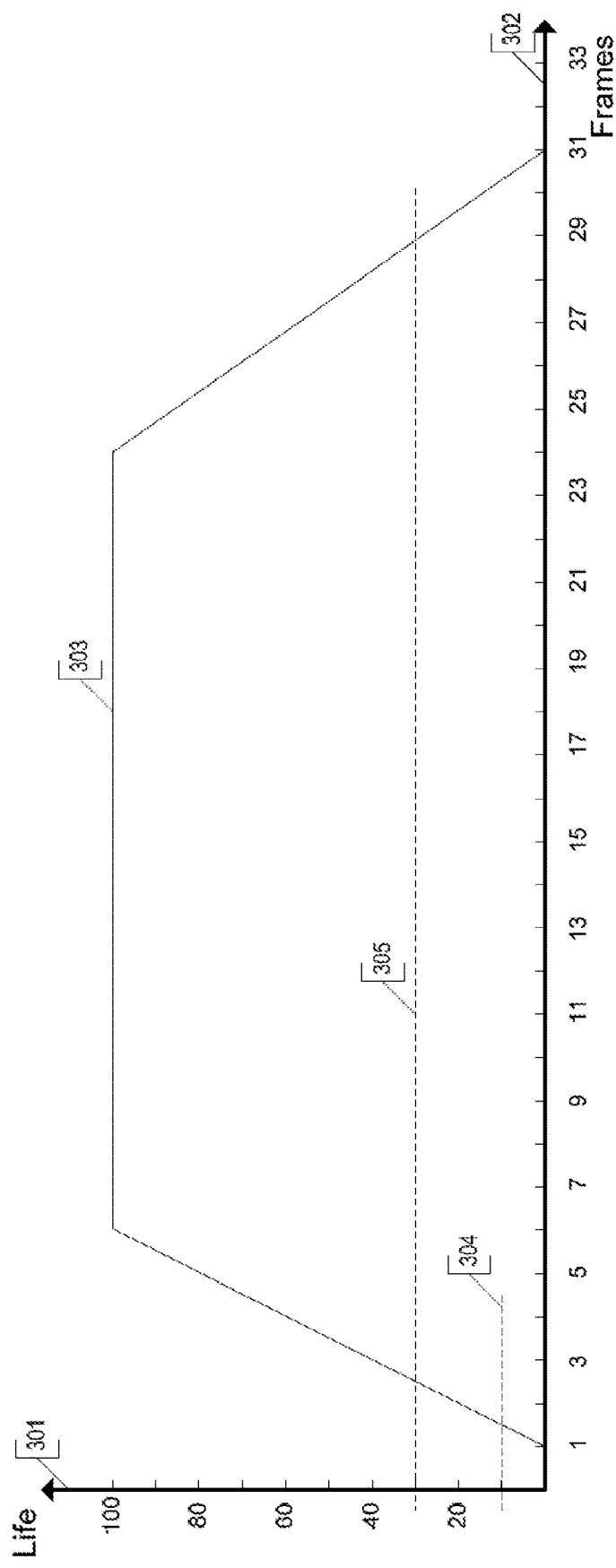
FIG. 3 is a diagram illustrating a life cycle of a tracked object.

The 'life' of each detection may be represented by track activity as a function of time, as shown in FIG. 3. The track activity is analysed on a frame-by-frame basis. The vertical axis represents the 'life' of a track 303. As an example, a first detection (or 'detect') appears at a time corresponding to frame 1, therefore a 'track' is created. The 'life' value then increases on the next consecutive frame, frame 2, if the 'detect' still exists at frame 2. In this example, the 'life' value increases until it reaches a maximum value of 100 at frame 6. The 'life' value may also decrease if the 'detect' disappears or has a less stable value. Predetermined or adaptively determined thresholds for track appearance and disappearance may be selected (304 or 305). The rate at which the 'track' appears or disappears may also be assigned a predetermined function (linear or non-linear).

Figure 4:
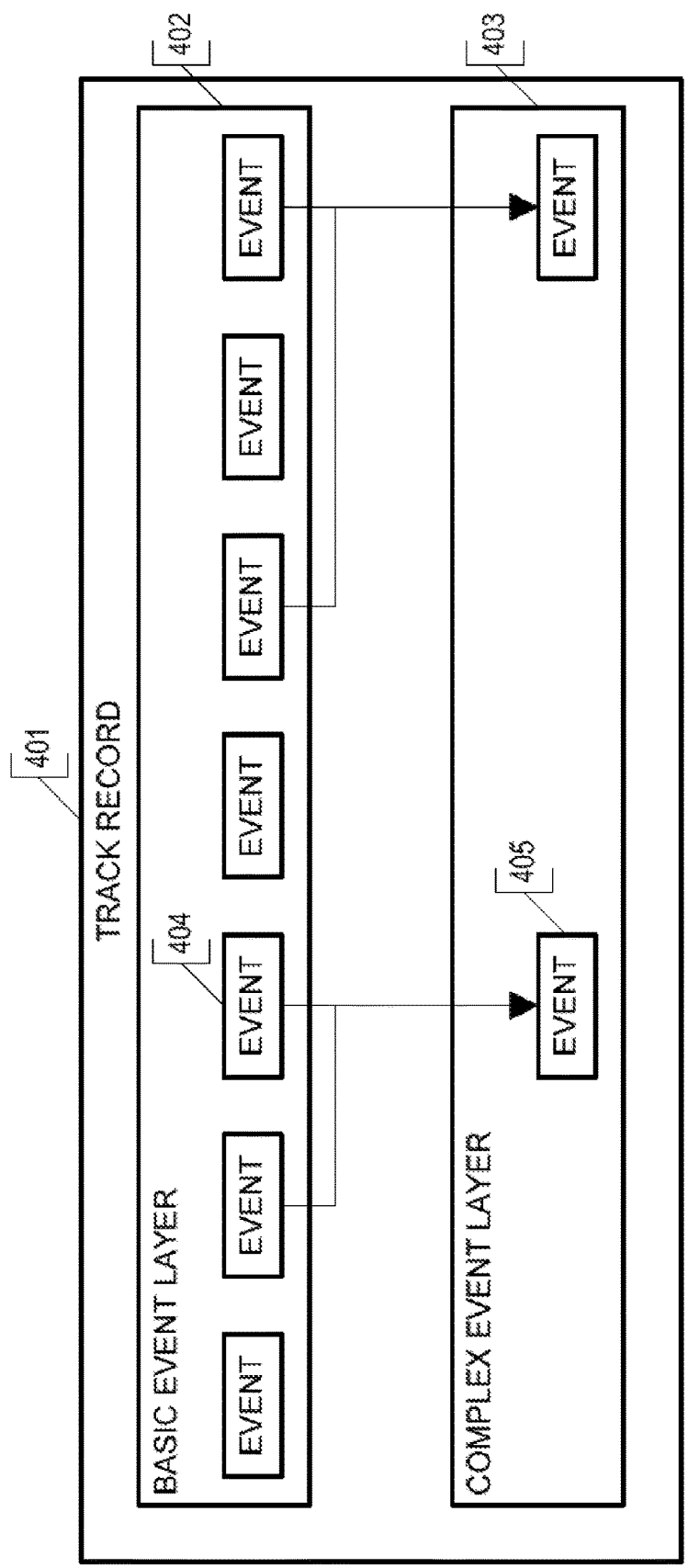
FIG. 4 is a diagram illustrating a Track Record (TR) comprising basic and complex events.

FIG. 4 shows an example of a Track Record (TR) 401 comprising a number of events. An event is a description of, or data associated with, a track activity—e.g. activity of an object that has been detected. The track activity may include parameters such as trajectory, pose, motion, rotation, area, angle or volume change. For example: if the track position has changed (e.g. the detected object moves during successive video frames), an event "MOTION" may be created with one of the following parameters: motion value in percentage, direction of motion or angle of motion in either polar or spherical coordinate system.

If the track area has changed (e.g. the tracked object gets larger during successive video frames) an event "AREA CHANGED" may be created with one of the following parameters: value in percentage or name of new area.

If the track angle has changed (e.g. the trajectory of the tracked object alters over successive video frames), an event "ANGLE CHANGED" may be created and associated with a parameter such as the angle in polar or spherical coordinate system. These examples of events may be included in the basic event layer 402. Complex events may be created after basic events have been analysed. As an example, after several "AREA CHANGED" events have occurred, a complex event may be created such as: "APPROACHING" or "LEAVING". A complex event can be based on an inference drawn from analysing simpler, or basic, events. The complex event can be dynamically generated in real-time as and when the conditions for its creation apply; there is no need to construct the complex event ahead of time.

Complex events may be included in the complex event layer 403. TR may also include additional information describing one or more of the following: colour, texture or shape.

Other examples of basic events are: "motion: hand down", "motion: hand up", "head moved to the left", "head moved to the right". From the analysis of more than one basic event, a complex event may be created such as: "waving both hands".

Figure 5:
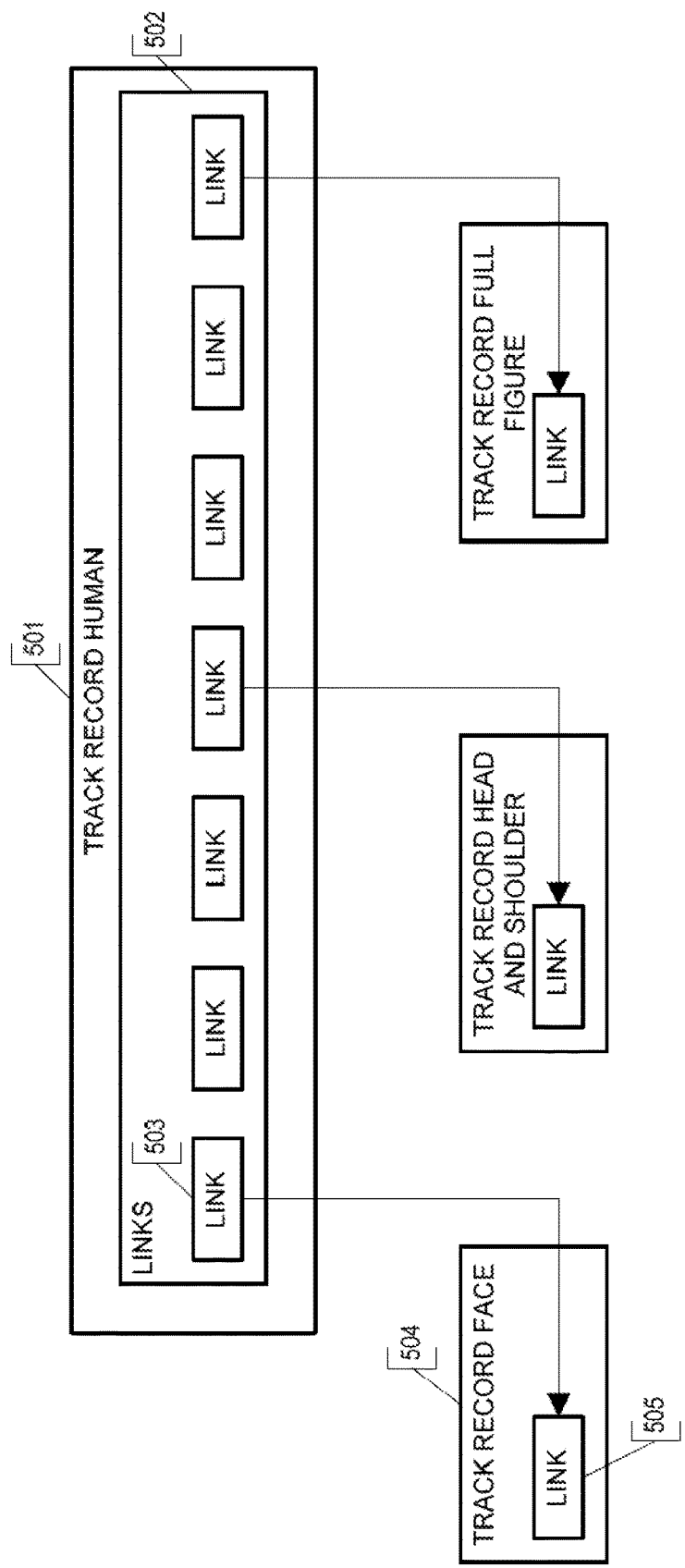
FIG. 5 is a diagram with an example of a complex TR comprising links to other TR.

FIG. 5 shows an example of a complex Track Record for a detected human: TR "HUMAN" 501. Empty slots 503 may be used to establish one or several links between TR501 and other TRs. The number of links present in a Track Record may be predetermined by for example a specific upstream application. The number of slots or links and their parameters may therefore be predefined and/or may adaptively change over time. Similarly, the logic for establishing a link may also either be predetermined or adaptively calculated. For example: a TR "HUMAN" may hold slots with links to one or more of the following: TR "FACE", TR "LEFT HAND", TR "RIGHT HAND". When the probability that a TR "FACE" belong to the TR "HUMAN" is high, a link is established within the TR "HUMAN" 503. Similarly, a reciprocal link is also established inside the TR "FACE" 505. Additional slots may also be included such as: TR "CELLULAR PHONE" and/or TR "LUGGAGE". When a link is established, an event "HUMAN LINKED WITH TR" is automatically created. When a link disappears, an event "HUMAN TR LINK BROKEN" is automatically created. A purpose for a complex TR is for analysing complex objects, or group of objects. Complex objects may be for example: a human, or group of humans or a combination of human and non-human objects, such as a human holding a luggage, a human holding a gun or a vehicle and its driver.

Figure 6:
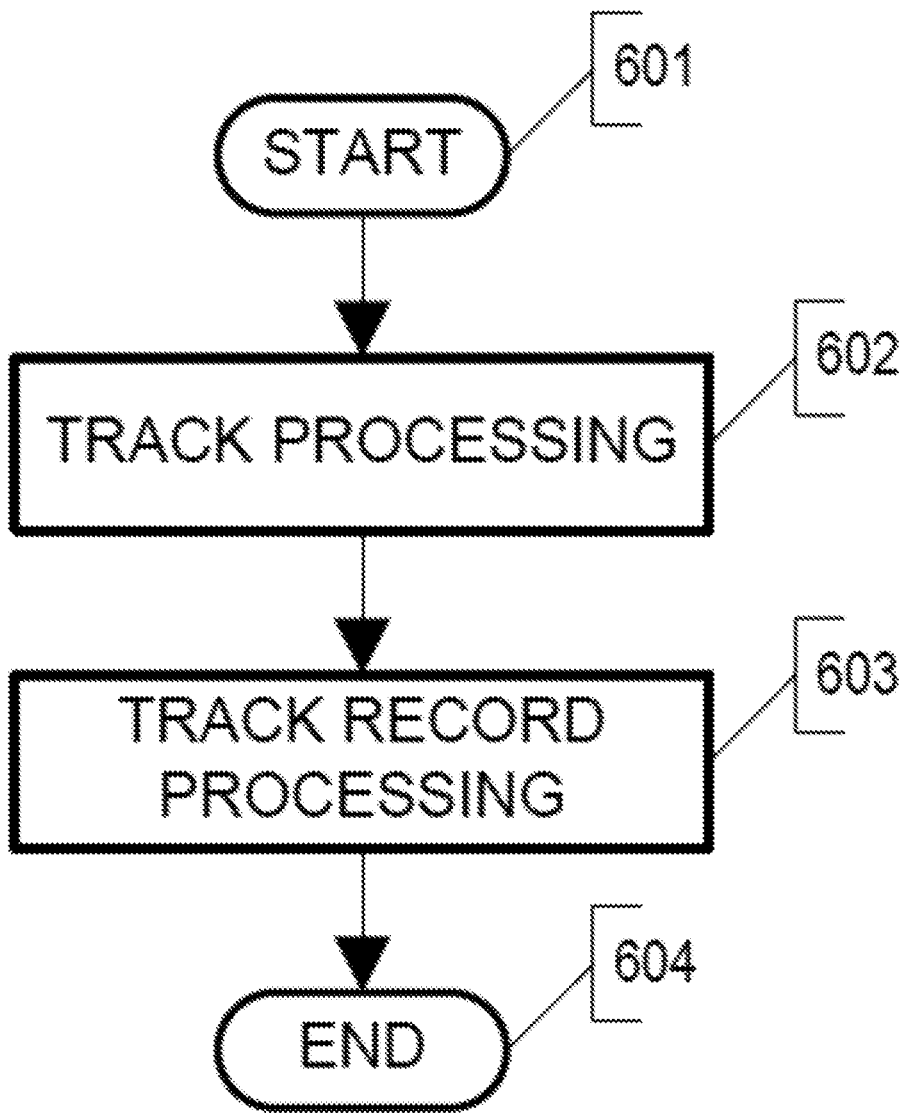
FIG. 6 is a flow diagram illustrating a procedure for processing a TR.

FIG. 6 shows a flow diagram with an example of a procedure for generating a TR corresponding to block 105 in FIG. 1. First, the block 602 comprises a 'Track Processing' step, wherein a TR or an event may be created. This step often corresponds to the creation of a first layer for a TR and may create basic detections such as: hand, face, full figure, etc. TR and/or complex event are then processed in the block 603 corresponding to 'Track Record Processing'. The TR processing 603 is responsible for creating each TR and also each complex event. This is the second layer for TR creation and most of them are a complex type, such as: human, group of humans and etc.

Figure 7:
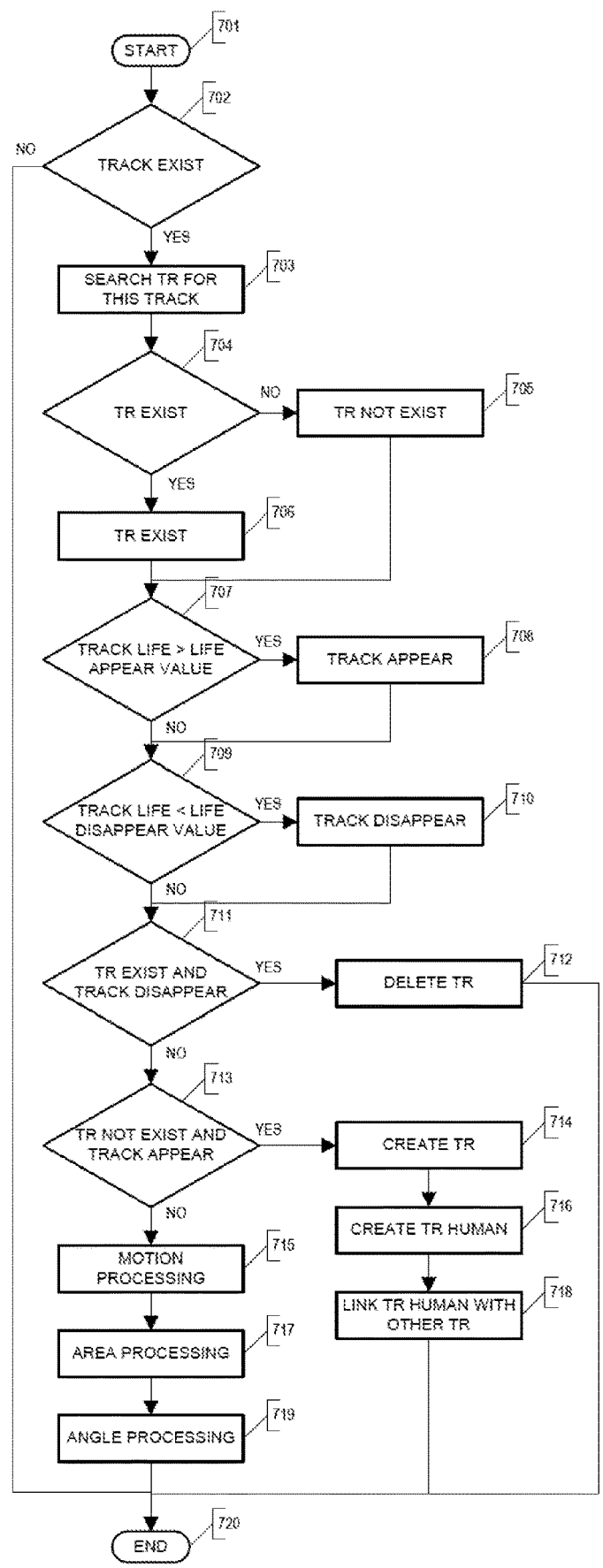
FIG. 7 is a flow diagram illustrating a procedure for track processing.

FIG. 7 shows a flow diagram with an example of a procedure for 'Track Processing' as shown in the block 602 (FIG. 6). The block 702 first receives track data. If track information is available, the block 703 performs a search within an array of TRs. The search procedure may find a TR created by this particular track. If TR exists 706, then a flag "TR EXIST" is created, and If TR does not exist 705, then a flag "TR NOT EXIST" is created. The block 707 checks the track life as explained in FIG. 3. If the track life is higher than a predefined value, then a flag "TRACK APPEAR" is created 708. If the track life is lower than a predefined value 709, then a flag "TRACK DISAPPEAR" is created 710. The block then 711 checks if the flags "TR EXIST" and "TRACK DISAPPEAR" exist. If the result is positive, then TR is removed or moved to an archive 712. The block 713 checks if the flags "TR NOT EXIST" and "TRACK APPEAR" exist. If the result is positive, then a TR is created. Depending on the results obtained through the different blocks, a TR "HUMAN" may be created 716. The block 718 then links the TR "HUMAN" to other appropriate TRs as shown in FIG. 5. The block 715 analyses the track motion. The block 717 analyses the track area. The block 719 analyses the track angle.

Figure 8:
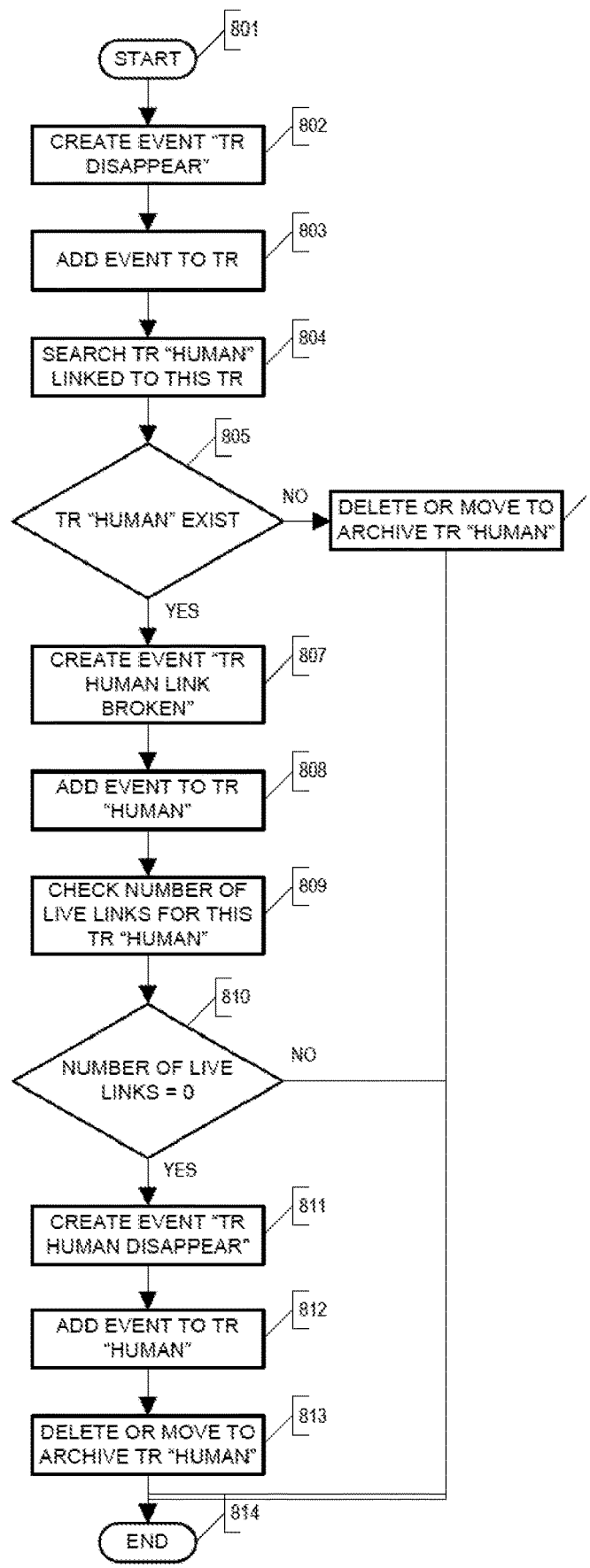
FIG. 8 is a flow diagram illustrating a procedure for deleting a moving to archive a TR.

FIG. 8 shows a flow diagram with an example of a procedure for deleting a TR or moving a TR to an archive, as shown in block 712 (FIG. 7). An event "TR DISAPPEAR" is first created 802. The block 803 then adds the event to the appropriate TR. The block 804 searches through an array of TRs. The search procedure may find a TR "HUMAN" with a slot linked to a current TR. If TR "HUMAN" does not exist, then TR needs to be deleted or moved to an archive 806. If TR "HUMAN" exists, then an event "TR HUMAN LINK BROKEN" is created. The block 808 adds the event to the appropriate TR "HUMAN". The block 810 calculates the quantity of empty slots in the TR "HUMAN". If all slots are empty, then an event with name "TR HUMAN DISAPPEAR" is created 811. The block 812 adds the event to the appropriate TR "HUMAN". The block 813 either removes TR "HUMAN" or moves it to an archive.

Figure 9:
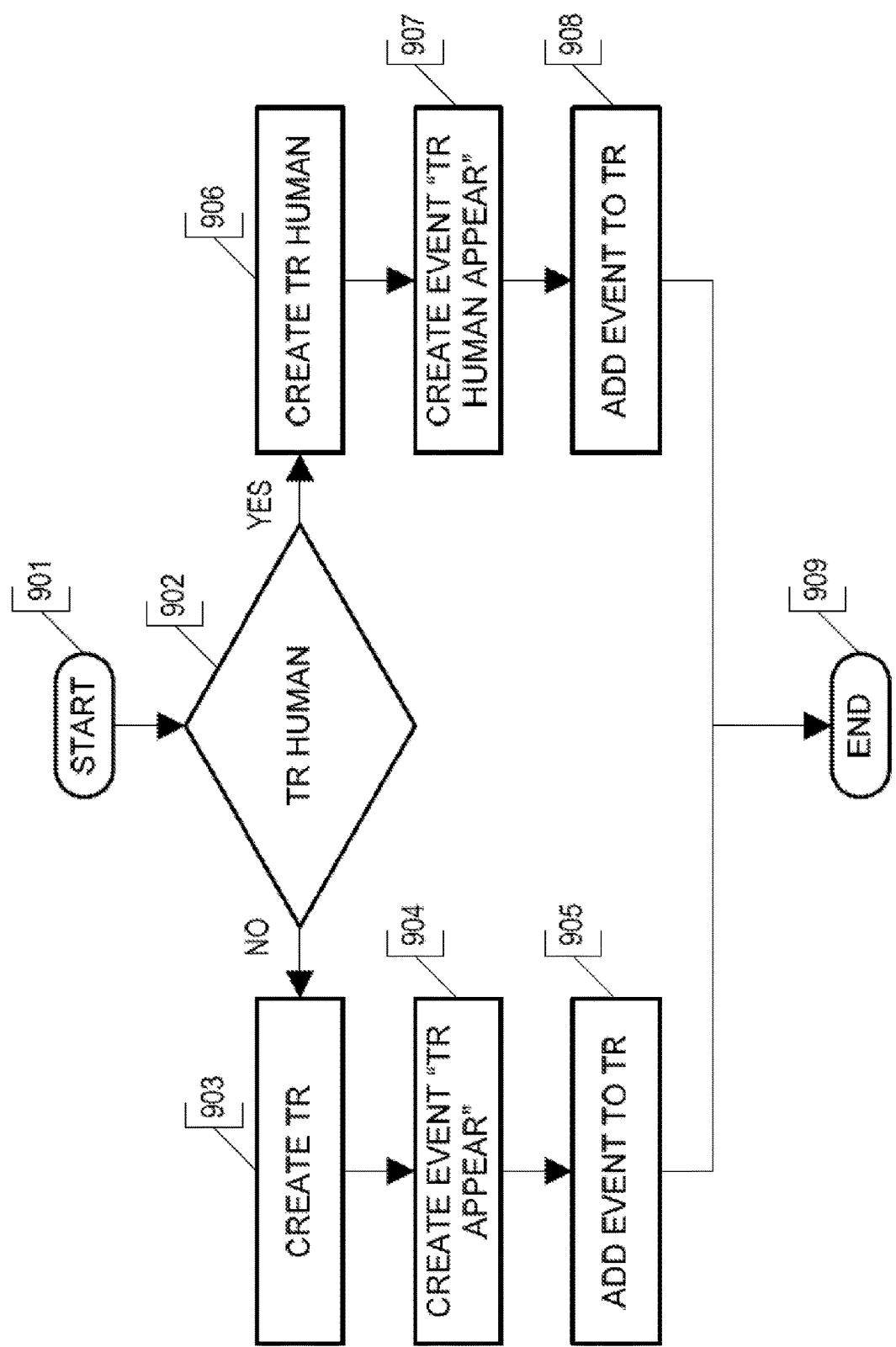
FIG. 9 is a flow diagram illustrating a procedure for creating a TR.

FIG. 9 shows a flow diagram with an example of a procedure corresponding to block 714 in FIG. 7. An object or object feature is detected and the block 902 first checks if the detected object is human. If the detection is associated with the type "HUMAN", then TR "HUMAN" is created 906. The block 907 then creates the event "HUMAN APPEAR" which is then added to the appropriate TR "HUMAN" 908. If the TR has the following type "NON HUMAN", then a simple TR is created 903. The block 904 creates an event "TR APPEAR", which is then added to the appropriate TR 905.

Figure 10:
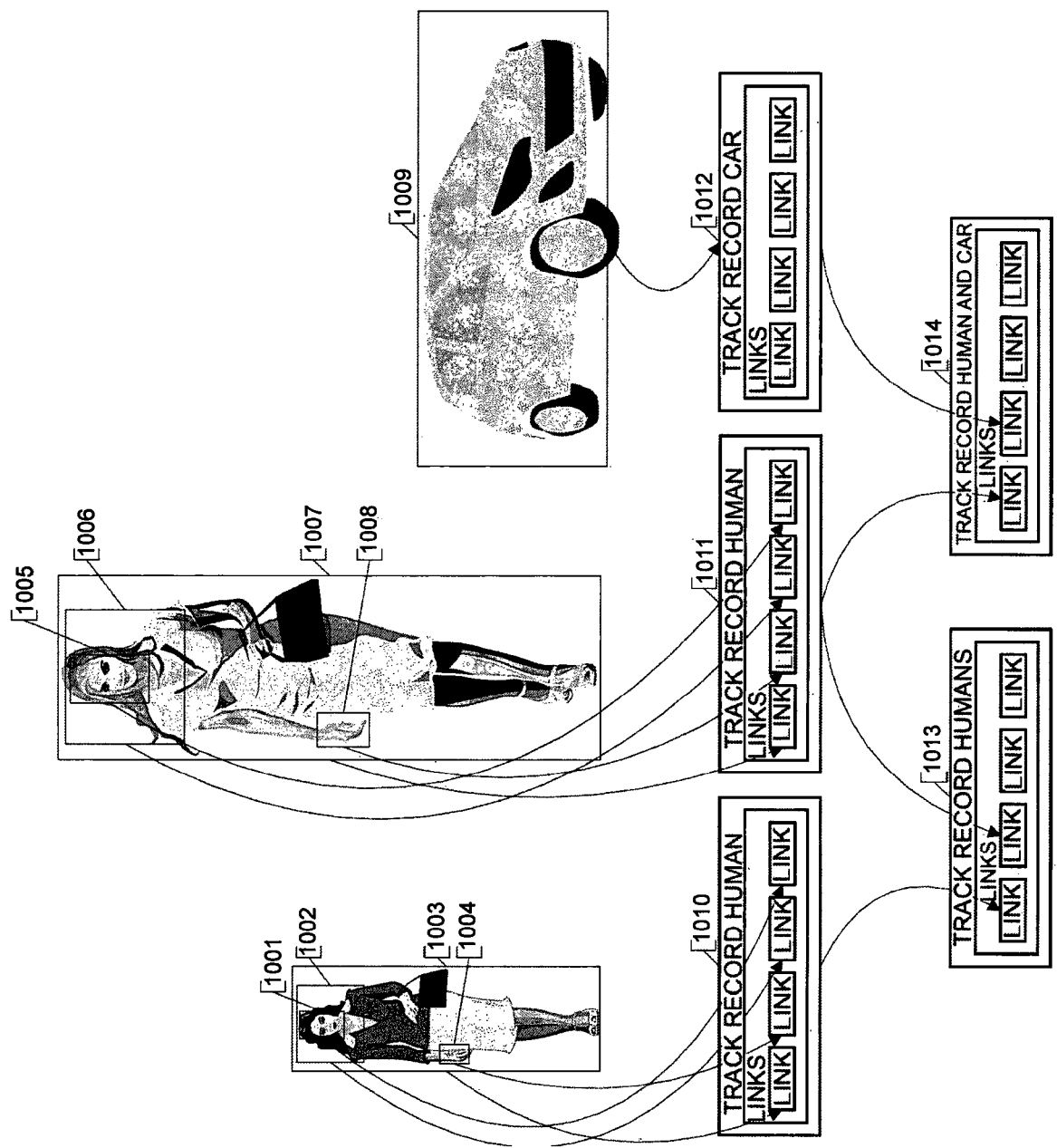
FIG. 10 is a set of images illustrating basic and complex TRs.

FIG. 10 shows three objects: two humans and one car. A simple TR is holding a single track. A simple TR may hold information on detected features such as one of the following: 1001, 1002, 1003, 1004 (human on the left side); 1005, 1006, 1007, 1008 (human in the middle); and 1009 (car on the right). Examples of complex Track Records are also given in 1010 to 1014 showing examples of links between the detected features (simple TRs) and complex TRs. Complex TR1010 is linked to simple TRs 1001, 1002, 1003 and 1004. Complex TR1011 is linked to simple TRs 1005, 1006, 1007, and 1008. Complex TR 1013 is linked to complex TR 1010 and TR 1011. Complex TR 1014 is linked to complex TR 1011 and simple TR 1012.

Figure 11:
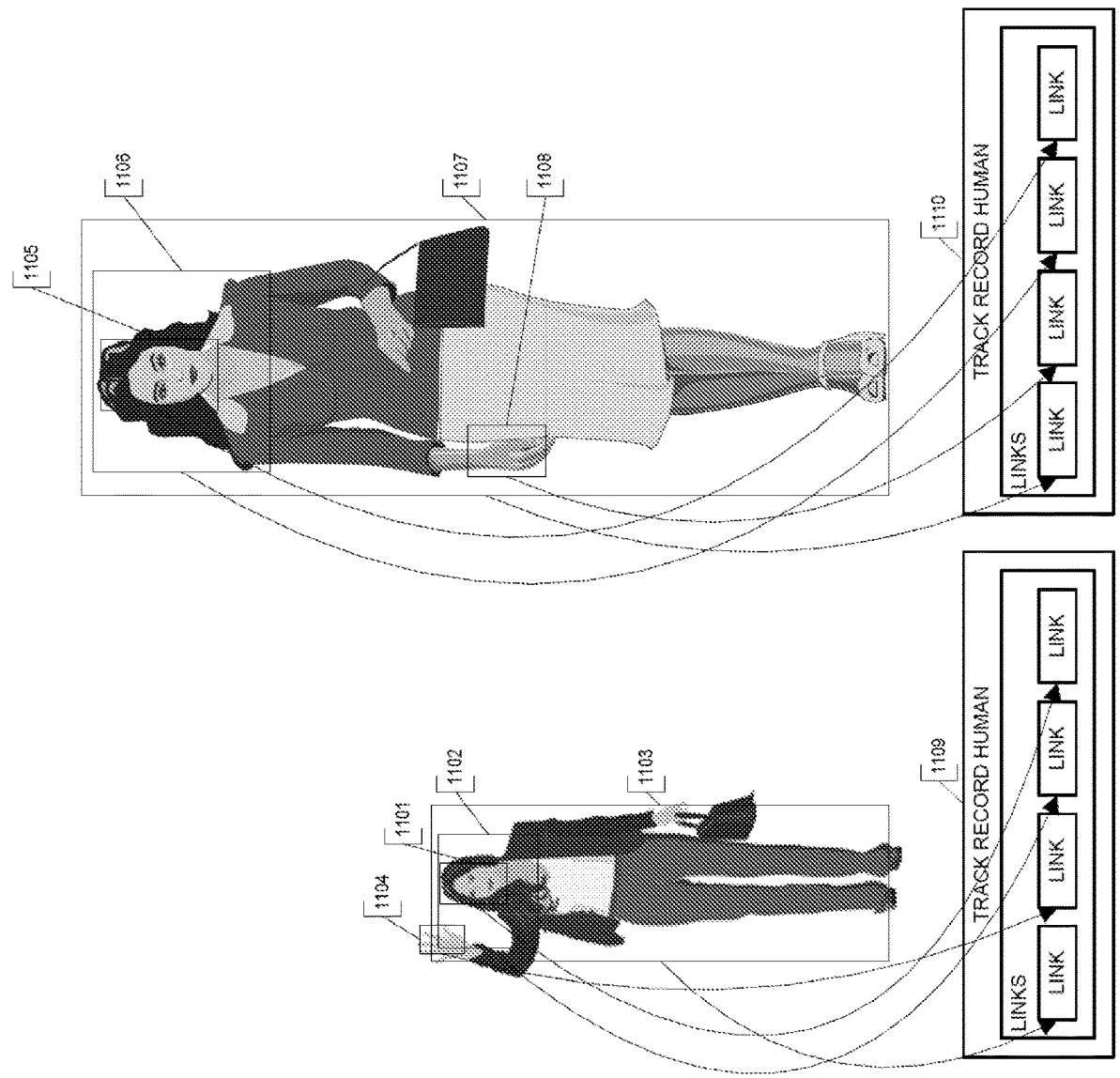
FIG. 11 is a set of images illustrating a TR "Human".

FIG. 11 shows the unification of a simple TR with a complex TR "HUMAN". The TRs "FACE" 1101 and 1105 are a reason to create the complex TR "HUMAN" 1109 and 1110. The TR "FF-HS" 1102 and 1106 are a reason to create the complex TR "HUMAN" 1109 and 1110. The TR "FF-HS" 1103 and 1107 is a reason to create the complex TR "HUMAN" 1109 and 1110. To avoid ambiguity, the complex TR "HUMAN" needs to be created once by the most important TR and other TRs need to be linked to this TR "HUMAN". The link creation should use the proper parts to achieve visual and mathematical equality. The TR 1103 needs to be connected to TR "HUMAN" 1109 as TR 1102. The connection procedure depicted in FIG. 13 as block 1314 and 1327.

Figure 12:
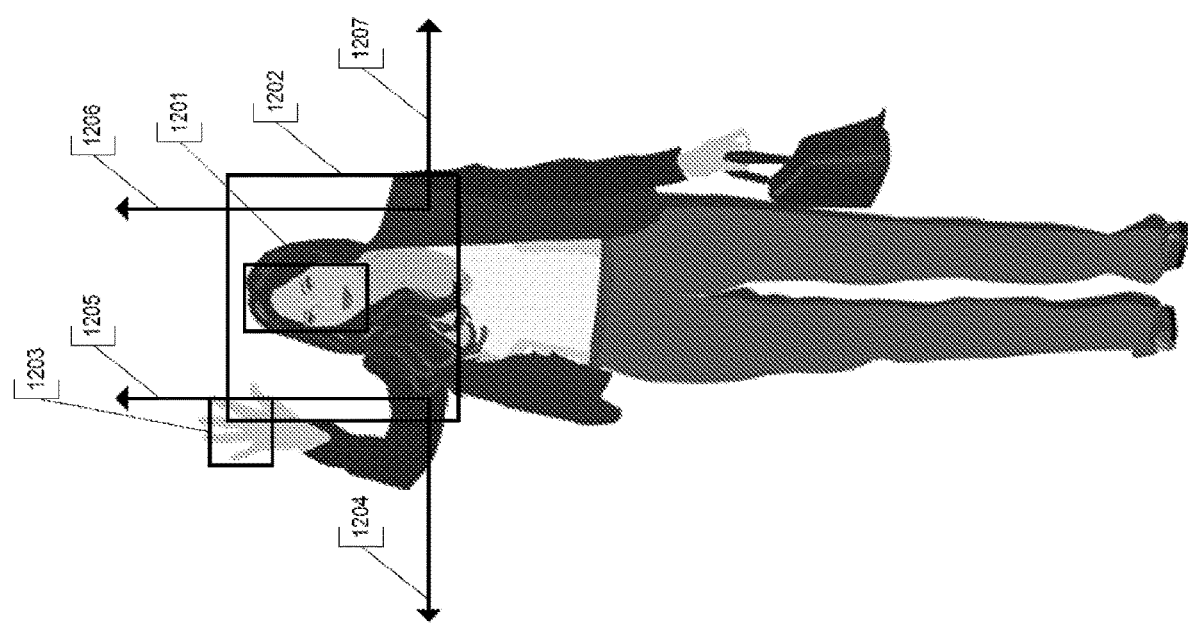
FIG. 12 is an image illustrating the detection and/or prediction of human elements.

FIG. 12 shows an image illustrating the following TR: TR "FACE" 1201, TR "HS-FACE" 1202 and TR "HAND" 1203. A procedure may be used to predict an area for the hand position with a high probability. From the knowledge that a human body has a limited number of angles of freedom, by drawing lines and angles near the joints of the human body, it is possible to predict the shape, size and area for the hand positions. The right hand position is therefore predicted by drawing the lines 1204 and 1205, whereas the left hand is predicted by drawing the lines 1206 and 1207.

Some corrections when drawing the lines may be needed. The shape of an area may be determined by either tracing a curve, circle, or eclipse using the trajectory of the hand, or by using a circle sector area or an ellipse sector area.

Figure 13:
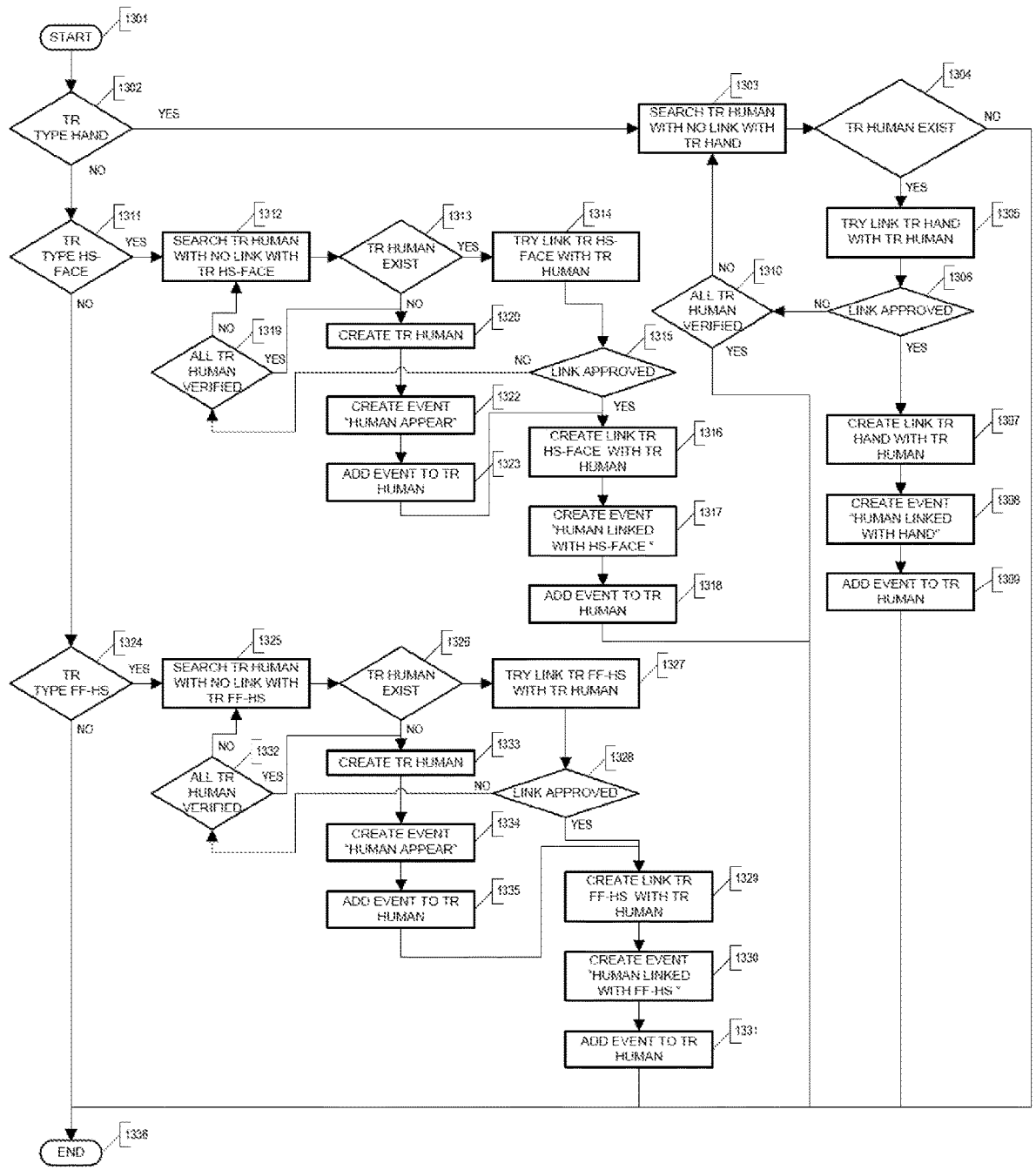
FIG. 13 is a flow diagram illustrating a procedure for adding an event to a TR.

FIG. 13 shows a flow diagram with an example of a procedure corresponding to block 716 in FIG. 7. The block 1302 first receives a TR data and checks the type of the TR. If the type is "HAND", then the block 1303 searches a TR "HUMAN" with an empty slot for hand. If there is a TR "HUMAN" with an empty slot, then the block 1305 links TR "HUMAN" with the TR "HAND". If the link is approved 1306, then the block 1308 creates an event "HUMAN LINKED WITH HAND". A link may be approved if for example the detected hand is in an area close enough to another detected feature. The block 1309 adds the event to the appropriate TR. The block 1307 adds a link to the empty slot inside TR "HUMAN" and adds to TR "HAND" a link to TR "HUMAN". If a link is not approved 1306, then the block 1310 asks how many TR "HUMAN" have been processed. If not all the TR "HUMAN" have been processed, then block 1303 is executed. The block 1311 receives the TR data and checks its type. If the TR type is "HS-FACE", then block 1312 searches a TR "HUMAN" with an empty slot for "HS-FACE". If a TR "HUMAN" exists with an empty slot, then the block 1314 links the TR "HUMAN" with the TR "HS-FACE". If the link is approved 1315, then the block 1317 creates an event "HUMAN LINKED WITH HS-FACE". The block 1318 then adds the event to the appropriate TR. The block 1316 adds the link to the empty slot inside TR "HUMAN" and adds a link between TR "HS-Face" and TR "HUMAN". If a link is not approved 1315, then the block 1319 asks how many TR "HUMAN" have been processed. If not all the TR "HUMAN" have been processed, then the block 1312 is executed. If a TR "HUMAN" does not exist 1313, then block 1320 creates a new TR "HUMAN". The block 1322 then creates an event "HUMAN APPEAR". The block 1323 adds the newly created event to the appropriate TR. The block 1324 receives the TR data and checks for the type of the TR. If the TR type is "FF-HS", then the block 1325 searches for a TR "HUMAN" with an empty slot for "FF-HS". If a TR "HUMAN" exists with an empty slot, then the block 1327 links the TR "HUMAN" with the TR "FF-HS". If the link is approved 1328, then the block 1330 creates an event "HUMAN LINKED WITH FF-HS". The block 1331 then adds this event to the appropriate TR. The block 1329 adds a link to the empty slot inside TR "HUMAN" and adds information on TR "FF-HS" about a link to TR "HUMAN". If the link is not approved 1328, then the block 1332 checks how many TR "HUMAN" have been processed. If not all TR "HUMAN" have been processed, then the block 1325 is executed. If none of the TR "HUMAN" processed are connected to the TR "FF-HS" 1326, then block 1333 creates a TR "HUMAN". The block 1334 creates an event "HUMAN APPEAR". The block 1335 adds this event to the appropriate TR.

Figure 14:
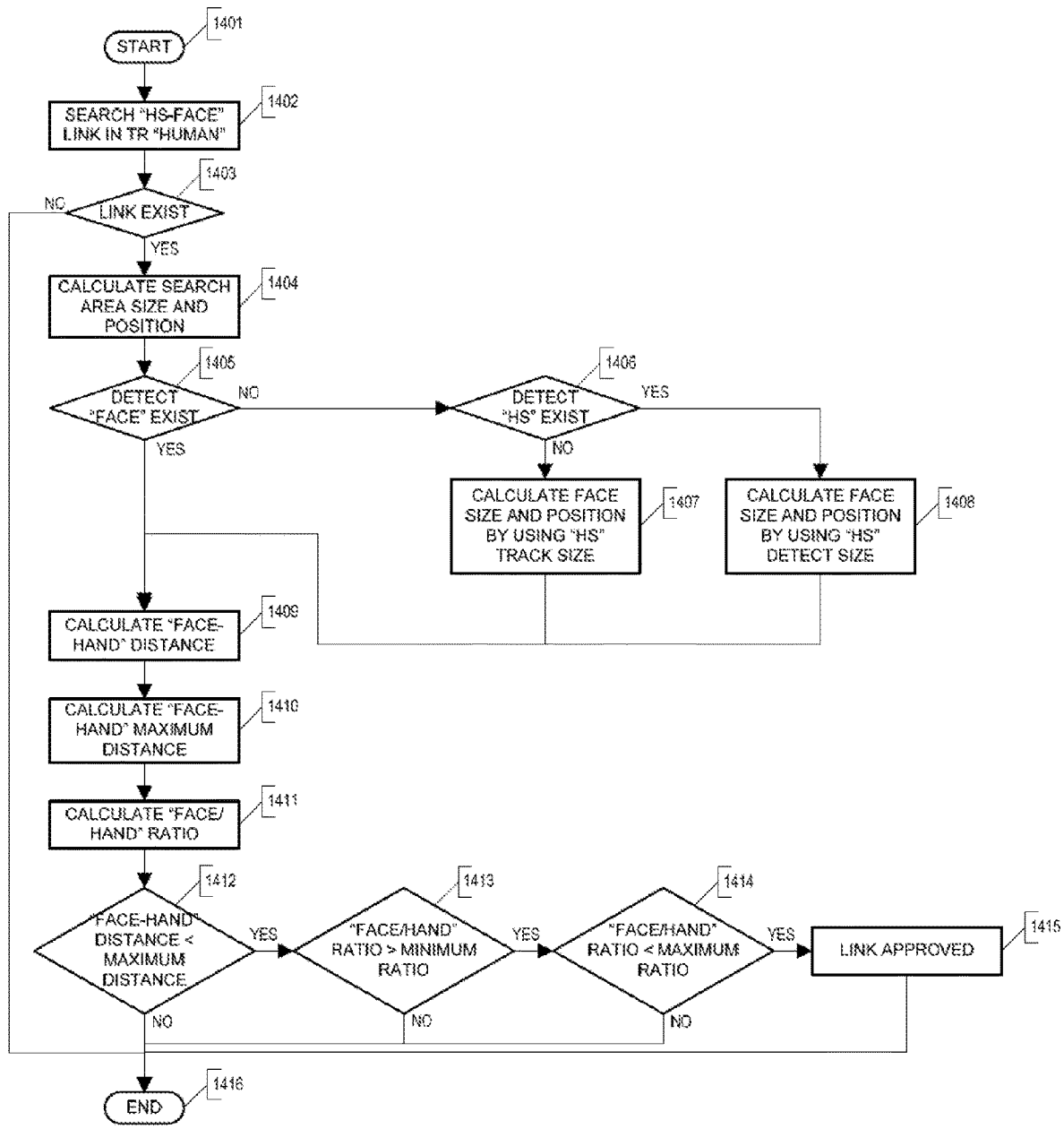
FIG. 14 is a flow diagram illustrating a procedure for connecting a complex TR with a hand TR.

FIG. 14 shows a flow diagram with an example for a procedure for approving a link as shown in blocks 1305 and 1306 in FIG. 13. The block 1402 receives a TR "HAND" data and a TR "HUMAN" data. A search procedure is performed, wherein a TR "HS-FACE" is extracted from a links set. If a link exists 1403, then the block 1404 calculates a search area and a search position as shown in FIG. 12. If a "FACE" detection exists 1405, then the block 1409 calculates the distance between the hand and the search position. The block 1410 then calculates the maximum distance between the hand and the search position.

The maximum distance $D_{max}$ between the hand and the search position may be determined in accordance with Equation (1): see FIG. 20.

In Equation (1), $W_{face}$ is the width of the face detected and x is either a predefined or adaptively computed coefficient.

The block 1411 calculates the "FACE/HAND" ratio. The ratio may be determined in accordance with Equation (2): see FIG. 20.

In Equation (2), $H_{face}$ is the height of face detect, $H_{hand}$ is the height of hand detect. If the distance between the hand and the search position is less than the maximum distance between the hand and the search position 1412, and then the block 1413 verifies if the "FACE/HAND" ratio is more than a predefined minimum value. The block 1414 verifies if the "FACE/HAND" ratio is less than a predefined maximum value. If all conditions are approved, then block 1415 approves the link between TR "HAND" and TR "HUMAN".

Figure 15:
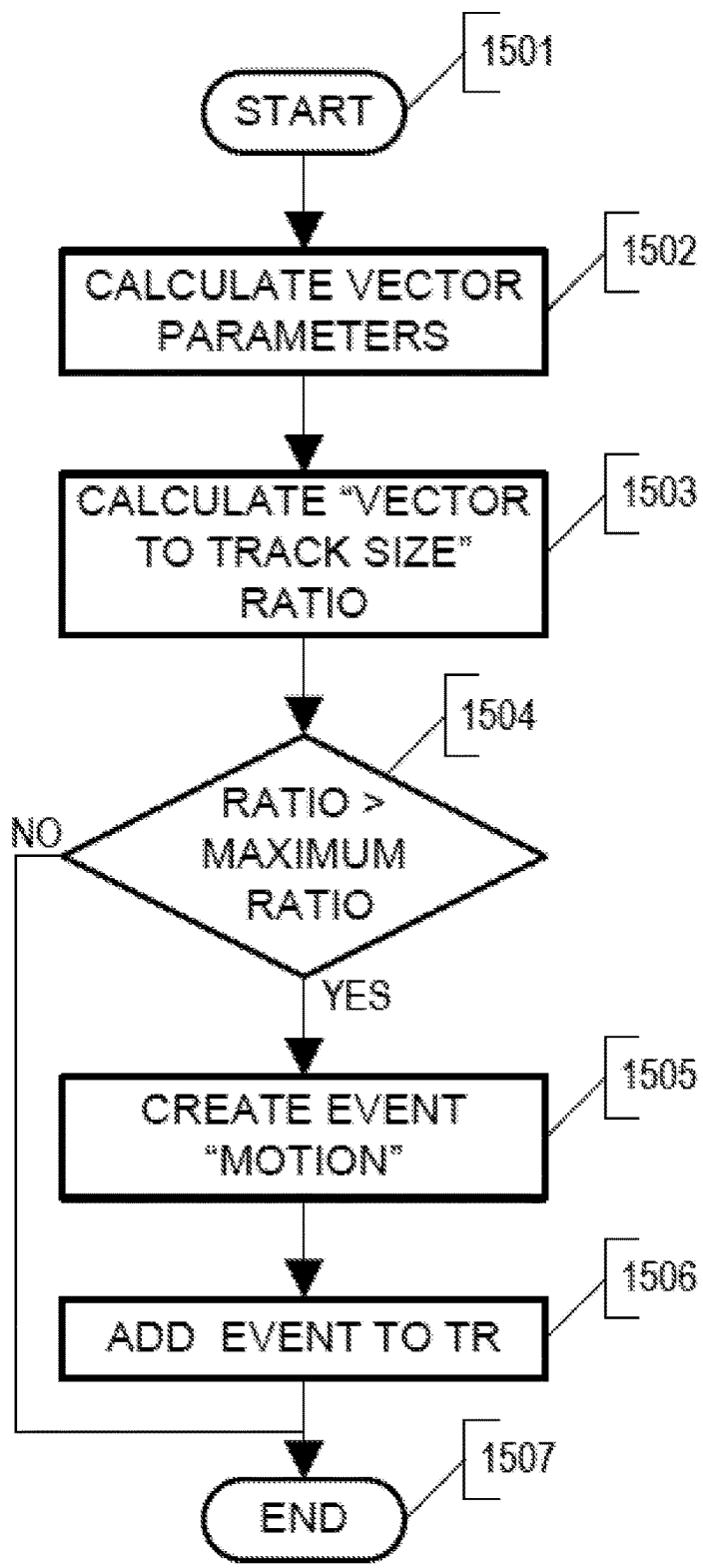
FIG. 15 is a flow diagram illustrating a procedure for creating and adding an event "Motion" to a TR.

FIG. 15 shows a flow diagram with an example of a procedure corresponding to the block 715 in FIG. 7. The block 1502 receives TR data and calculates the vector parameters. The start position of the vector is the position of TR at the previous time period and the end position of the vector is the position of TR at the present time. The vector length may be determined in accordance with Equation (3): see FIG. 20.

In Equation (3), $X_{end}$ is the X coordinate at end position, $X_{start}$ is the X coordinate at start position, $Y_{end}$ is the Y coordinate at end position and $Y_{start}$ is the Y coordinate at start position.

The block 1503 calculates the "VECTOR/TRACK SIZE" ratio. The ratio may be determined in accordance with Equation (4): see FIG. 20.

In Equation (4), L is the vector length and $TR_h$ is the TR height.

The block 1504 verifies if the "VECTOR/TRACK SIZE" ratio is more than a predefined maximum value. If the condition is satisfied, then the block 1505 creates an event "MOTION". The block 1506 then adds this event to the appropriate TR.

Figure 16:
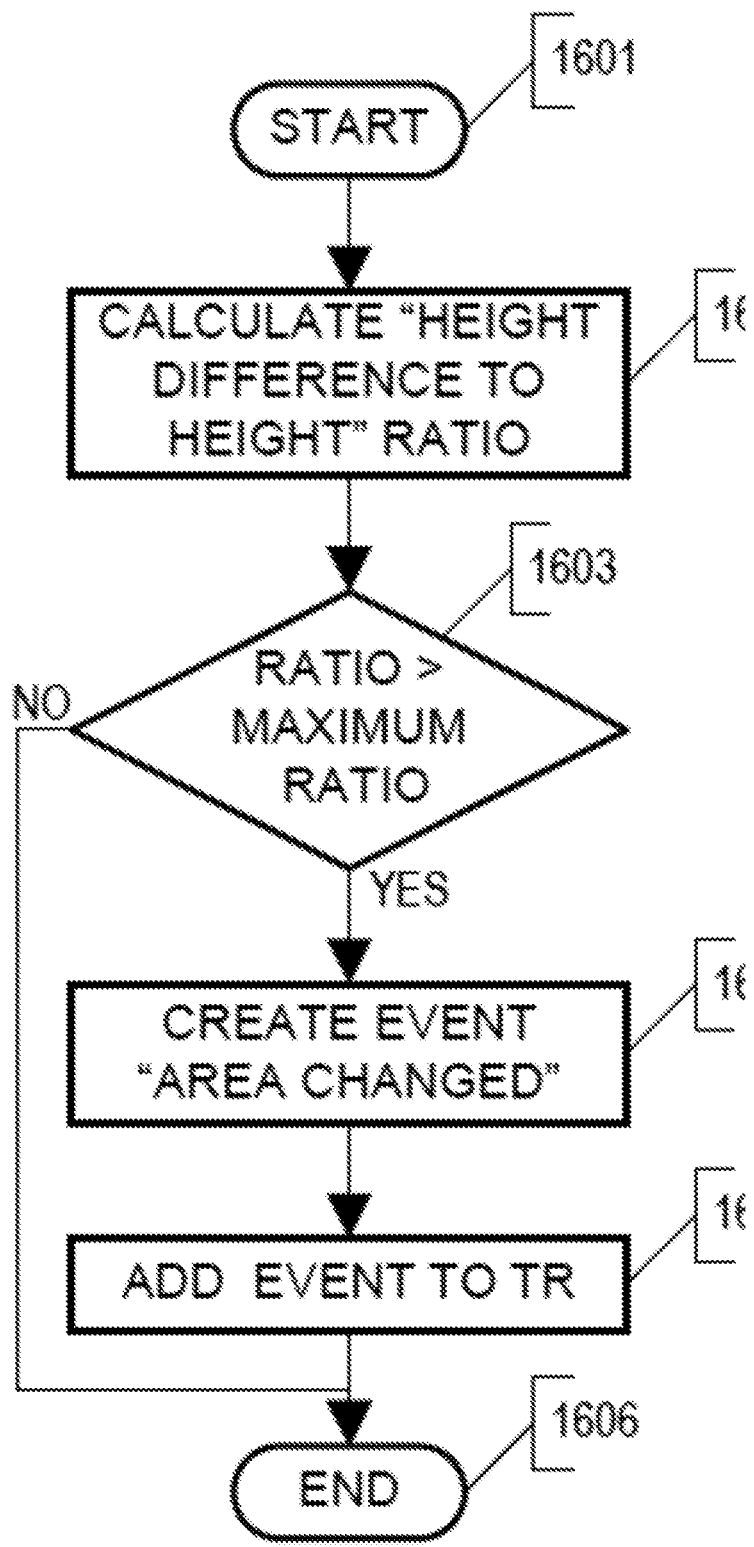
FIG. 16 is a flow diagram illustrating a procedure for creating and adding an event "Area Changed" to a TR.

FIG. 16 shows a diagram with an example of a procedure corresponding to the block 717 in FIG. 7. The block 1602 receives TR data and calculates the "HEIGHT DIFFERENCE TO HEIGHT" ratio. The ratio may be determined in accordance with Equation (5): see FIG. 21.

In Equation (5), $H_c$ is the height of TR at the current time and Hp is the height of TR in the preceding time period. The block 1603 verifies if the "HEIGHT DIFFERENCE TO HEIGHT" ratio is more than a predefined maximum value. If the condition is satisfied, then the block 1604 creates an event "AREA CHANGED". The block 1605 adds this event to the appropriate TR.

Figure 17:
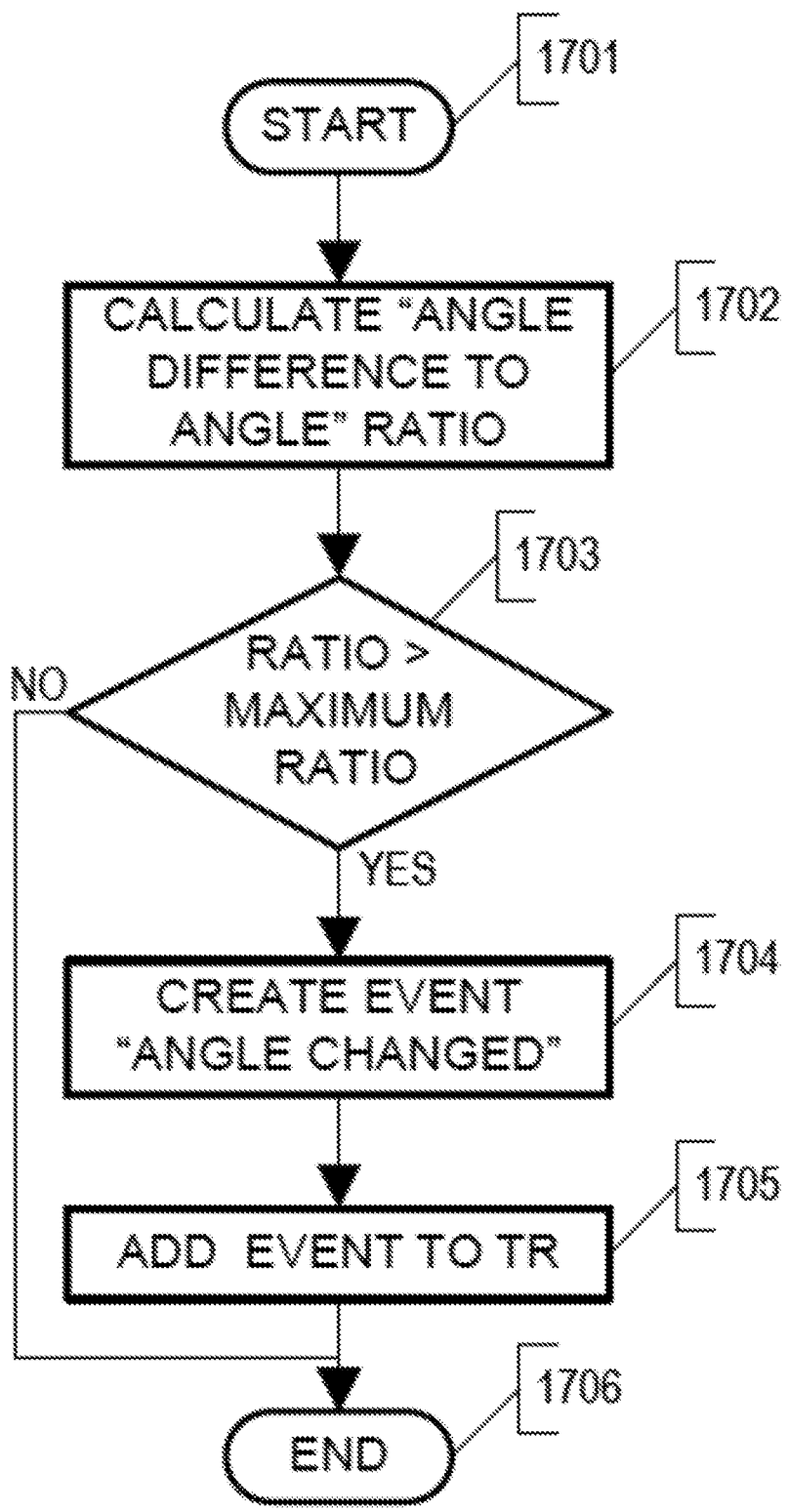
FIG. 17 is a flow diagram illustrating a procedure for creating and adding an event "Angle Changed" to a TR.

FIG. 17 shows a flow diagram with an example of a procedure corresponding to the 719 in FIG. 7. The block 1702 receives the TR data and calculates the "ANGLE DIFFERENCE TO ANGLE" ratio. The ratio may be determined in accordance with Equation (6): see FIG. 21. In Equation (6), $A_c$ is the angle of TR in current moment of time and $A_p$ is the angle of TR in previous moment of time.

The block 1703 verifies if the "ANGLE DIFFERENCE TO ANGLE" ratio is more than a predefined maximum value. If the condition is satisfied, then the block 1704 creates an event "ANGLE CHANGED". The block 1705 adds the event to the appropriate TR.

Figure 18:
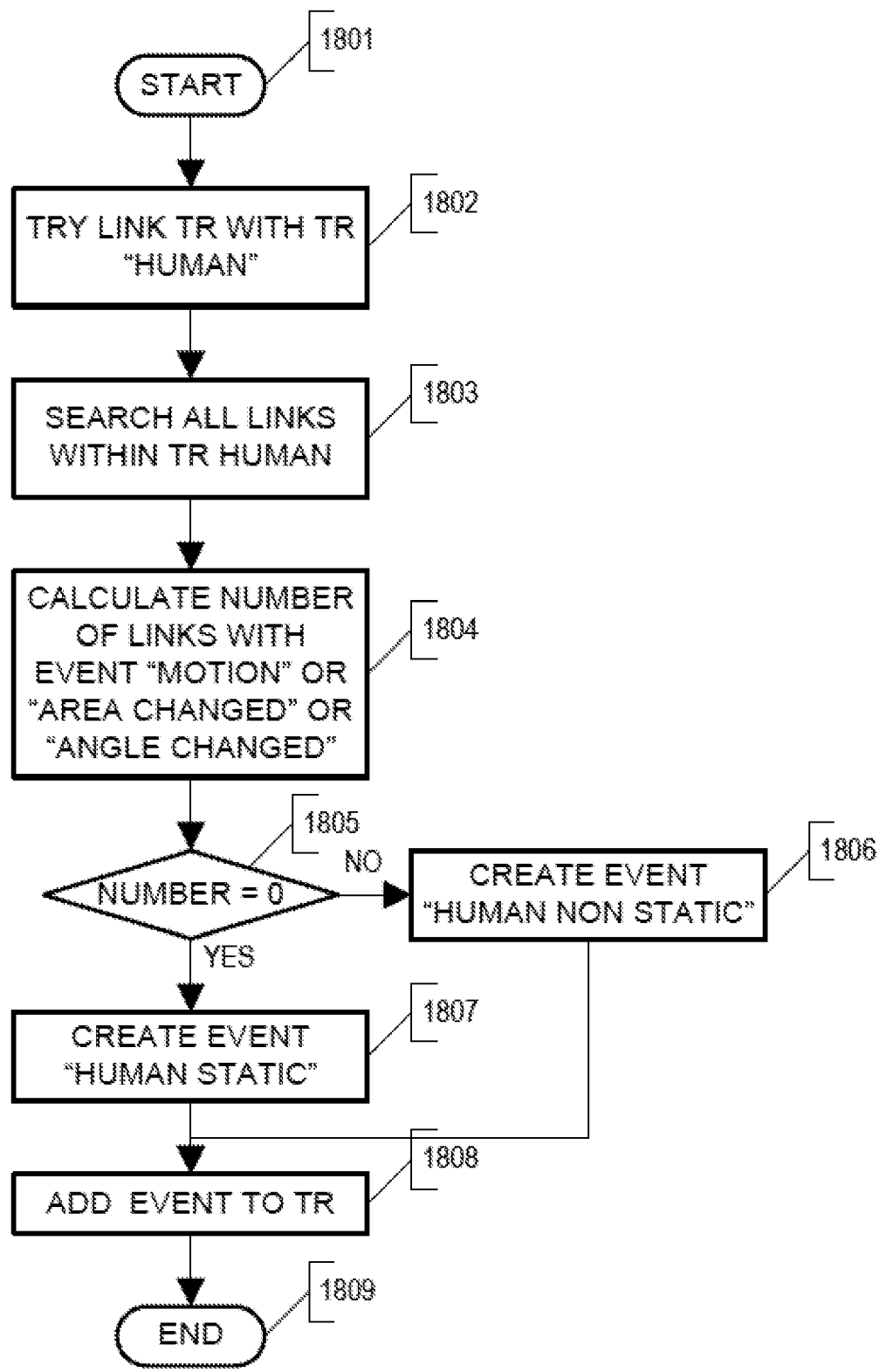
FIG. 18 is a flow diagram illustrating a TR analysis and a procedure for generating a complex event.

FIG. 18 shows a flow diagram with an example of a procedure corresponding to the block 603 in FIG. 6. The diagram illustrates the procedure of creating links between a TR and a TR "HUMAN" and the creation of complex events. The block 1802 receives a TR data and a TR "HUMAN". The block 1802 performs the procedure as shown in FIG. 13. The block 1803 searches within the links in the TR "HUMAN". The block 1804 searches all TR, which includes links to the following events: "MOTION" or "AREA CHANGED" or "ANGLE CHANGED". If the search returns no link 1805, then the block 1807 is creates an event "HUMAN STATIC". The block 1808 adds this event to the appropriate TR "HUMAN". If the number of links found is greater than zero 1805, then the block 1806 creates an event "HUMAN NON STATIC". The block 1808 adds the event to the appropriate TR "HUMAN".

Figure 19:
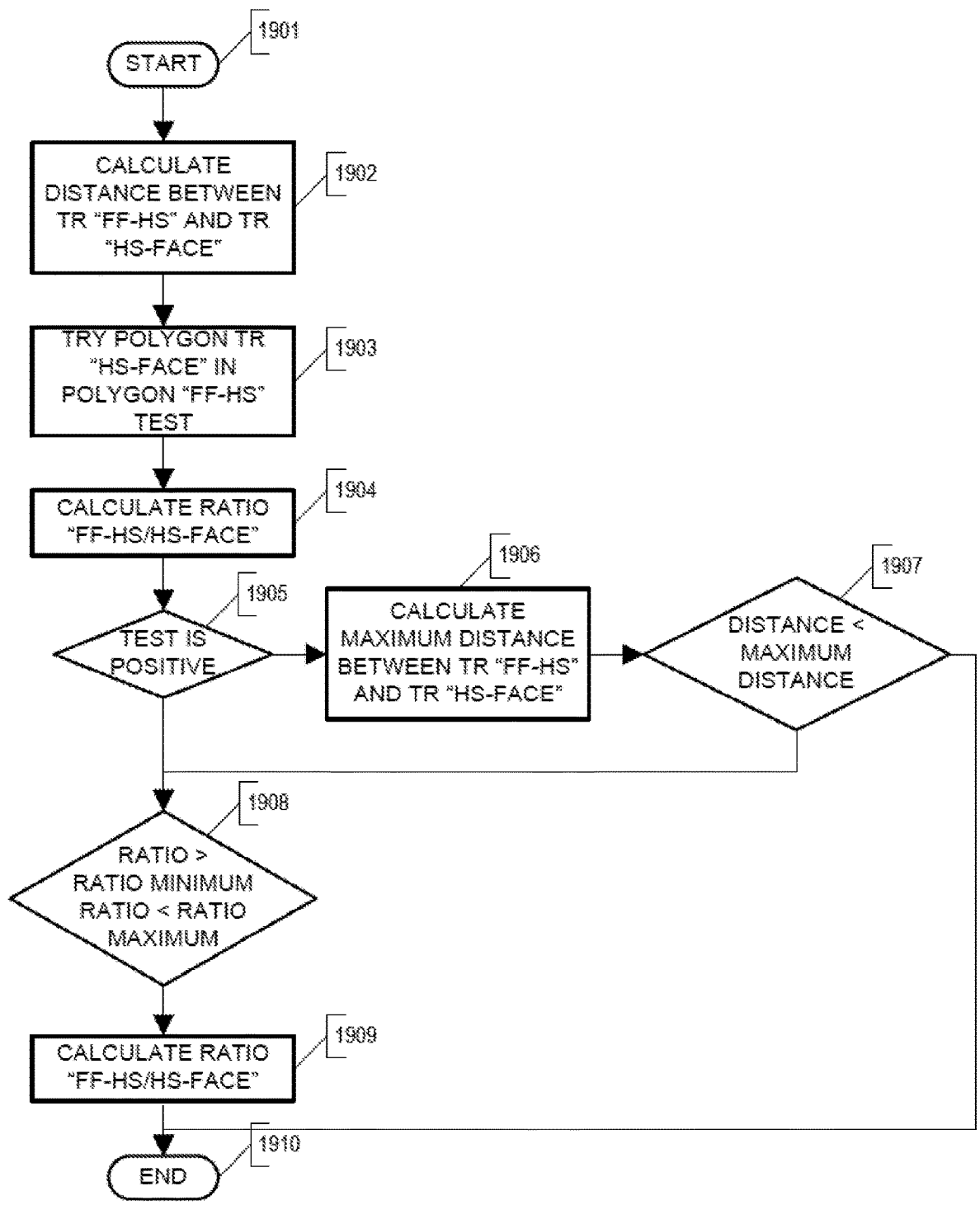
FIG. 19 is a flow diagram illustrating a procedure for connecting complex TR.

FIG. 19 shows a flow diagram with an example of a procedure corresponding to the blocks 1314 and 1327 in FIG. 13, wherein links are created between TR and TR "HUMAN". The block 1902 receives a TR "FF-HS" data and a TR "HS-FACE" data. The block 1902 calculates the distance between the center of TR "FF-HS" and the center of TR "HS-FACE". The block 1903 verifies the relationship between the geometry of TR "FF-HS" data and the TR "HS-FACE". The test "polygon in polygon" is for answering the following questions: is it a polygon that is completely inside another polygon? The block 1904 calculates the ratio "FF-HS/HS-FACE". The ratio may be determined in accordance to Equation (7): see FIG. 21.

In Equation (7), $H_{FF-HS}$ is the height of TR FF-HS and $H_{HS-FACE}$ is the height of TR HS-FACE. If the result of the test is positive 1905, then the block 1906 calculates the maximum distance between the center of TR "FF-HS" and the center of TR "HS-FACE". The maximum distance may be determined in accordance with Equation (8): see FIG. 21.

In Equation (8), $H_{ff-hs}$ is the height of TR "FF-HS" and x is a coefficient that has been pre-defined or that has been found using an adaptive procedure.

The block 1907 verifies if the distance is less than the maximum distance, then the block 1908 is executed. The block 1908 checks if the ratio is more than the minimum ratio and less than the maximum ratio. If the condition is satisfied, then the block 1909 creates the link between TR and appropriate TR "HUMAN".

Image sensor module: an image sensor may comprise a module implementing the methods as described above. The image sensor module may receive a video stream and analyse the video on a frame-by-frame basis, and may subsequently continuously create events that can then be pushed into other smart or connected devices as specific commands. The sensor module may not stream video to another device. The sensor module may be a SoC that includes a GPU; the GPU may itself be programmed to implement some or all of the methods described above. Having an embedded processor or SoC with sophisticated computer vision capabilities able to provide real-time information about an object or group of objects behavior would be very useful in many contexts. Where the methods are implemented in firmware or hardware (or some combination of the two), then operation can be very fast and power efficient, key requirements for extending the capabilities of IoT computer vision systems.

The present invention enables a wide range of applications, as third parties may then use the information related to one or several object behaviours and provide tailored services in real-time:

Basic events may be analysed, such as a simple hand or head gesture which can then be used as a specific command to control a connected device.

Thanks to the understanding of human behaviour within a specific environment, space utilization may be understood and optimized in order to control for example the environment (e.g. lighting or an HAVC system).

Evacuation systems: by understanding precisely locations and people's presence, state of the art evacuation systems may be enhanced.

Monitoring people approaching or leaving dangerous areas.

Commercial environments: the number of people entering or leaving a store may be monitored.

Suspicious behaviour may be detected, such as a person holding a gun, or leaving a baggage unattended.

Enhancement of security systems with a large number of image sensors: a list of suspicious events may be represented in a machine-readable form, and may also be pushed to further devices as specific commands, without the need for a human operator to review.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A computer-implemented method of sending an instruction to a security system, the method including a computer vision process, the method including the steps of:
   (i) creating a track record for a weapon, the track record defining metadata or parameters for the weapon, in which the track record relates to a person;
   (ii) linking that track record to a higher-level track record for a higher-level object, wherein the higher-level object is the person, the higher-level track record including data for trajectory, pose and gesture of the person, in which the link between the respective track records for the weapon and for the higher-level object is established when a probability that the weapon is associated with the higher-level object exceeds a threshold;
   (iii) storing the higher level track record in a database;
   (iv) monitoring a trajectory of the person using the stored track record of the person;
   (v) analyzing each of a pose of the person, a gesture made by the person, and an identity of the person;
   (vi) inferring an intent or purpose of the person when approaching an area of danger from the pose of the person, the gesture made by the person, and the identity of the person, each analyzed in step (v), and using the trajectory stored in step (iii) and monitored in step (iv); and
   (vii) sending a machine readable instruction to a security system, depending on the intent or purpose that has been inferred.

2. The method of claim 1, implemented by a computer vision engine localized in a sensor or system-on-chip (SoC).

3. The method of claim 1, implemented by a computer vision engine localised in a camera or other device including a sensor, or in a hub or gateway connected to that device, or in a remote server, or distributed across any permutation of these.

4. The method of claim 1, in which no output of any video or still images for display on a monitor or screen and from which an individual can be identified is provided.

5. The method of claim 4 in which an identity or specific appearance of a person is obfuscated.

6. The method of claim 1, including the step of inferring an intent of the person to whom the track record relates, and a second machine readable instruction is then sent, depending on the intent that has been inferred.

7. The method of claim 1, in which the higher level track records are a hierarchical organisation of simpler track records.

8. The method of claim 7 in which the hierarchical organisation is dynamically created in real-time.

9. The method of claim 1, in which a track record is a record of events relating to an object and includes data for one or more of: presence or identity of that object.

10. The method of claim 1, in which the higher level track record stored in the database is stored in a MySQL-type database, correlated with a video database.

11. The method of claim 1, in which a track record for an object is a first track record, wherein the first trace record enables information about that object to be inferred from a track record of a second object, and that first track record is a higher-level track record or is at the same level as the track record for that second object.

12. The method of claim 1, in which, where a first object has a known size or shape, then information about the size or shape of a second object is inferred from the track record of the first object.

13. The method of claim 1, in which, where a second object is a car, or other object of generally known dimension(s), then information about the height of the person near the car or other object is inferred from the track record of the second object.

14. The method of claim 1, in which, where a first object has a known relationship to a second object, then information about the presence of the first object is inferred from the presence of the second object.

15. The method of claim 1 in which the probability is a function of one or more of: proximity, position, movement, trajectory, length, area, volume, angular position, colour, temperature.

16. The method of claim 1 in which the person is a first person and in which heads and hands are linked to define a single higher level object, which is a second person, if the heads and hands are sufficiently close, or move in a consistent manner.

17. The method of claim 1, in which a track record for one or more higher-level object is linked to one or more track records for further higher-level objects.

18. The method of claim 1, in which track records include slots, in which empty slots in a higher-level track record for a higher-level object are reserved to establish links to a detected object, or its track record, in a lower-level track record.

19. The method of claim 1, in which track records include slots, in which empty slots in a higher-level track record for a higher-level object are reserved to establish links to an object at the same level.

20. The method of claim 1, in which a number of links in a track record is predetermined.

21. The method of claim 1, in which a number of links in a track record can adaptively change over time.

22. The method of claim 1, in which track records include slots, in which, if a higher-level track record for a higher level object has an empty slot for a specific kind of object, then detected objects are searched for that are candidates to be linked to that empty slot.

23. The method of claim 1, in which, if one detected object disappears, but an associated higher level object is still being tracked, then if the detected object is re-detected, the detected object is rapidly re-associated with that higher-level object.

24. The method of claim 1, in which a higher-level track record is created if the track records for several objects share sufficiently similar or otherwise related parameters.

25. The method of claim 1, in which if the trajectory or pose of several humans, as defined in a track record for each human, is sufficiently similar, then a track record for a group consisting of those humans, is automatically created.

26. The method of claim 1, in which examples of detected objects include: face, hands, head & shoulders, full figure, cars, other specific kinds of object.

27. The method of claim 1, in which a track record includes one or more complex events, which are each formed from an analysis of simpler events.

28. The method of claim 27 in which a complex event is formed from a sequence of simpler events.

29. The method of claim 28 in which complex events are a hierarchical organisation of simpler events.

30. The method of claim 28 in which complex events are dynamically created in real-time and are not predetermined.

31. The method of claim 28 in which a sequence of area change events for a detected object is interpreted as the complex event of the object approaching or leaving.

32. The method of claim 28 in which complex events define gestures to which meaning is attributed.

33. The method of claim 28 in which complex events describe, classify or infer a person's behaviour or intent or needs.

34. The method of claim 1 in which the computer vision process is used to control evacuation of a building.

35. The method of claim 1 in which the computer vision process is used to monitor people approaching and leaving defined areas, which are high-security or dangerous areas.

36. The method of claim 1 in which the computer vision process is used to identify a person holding a gun or other weapon.

37. Chip-level firmware embodied on a non-transitory storage medium, the firmware executable in a computer vision engine to:
  (i) create a track record for a weapon, the track record defining metadata or parameters for the weapon, in which the track record relates to a person;
  (ii) link that track record to a higher-level track record for a higher-level object, wherein the higher-level object is the person, the higher-level track record including data for trajectory, pose and gesture of the person, in which the link between the respective track records for the weapon and for the higher-level object is established when a probability that the weapon is associated with the higher-level object exceeds a threshold;
  (iii) store the higher level track record in a database;
  (iv) monitor a trajectory of the person using the stored track record of the person;
  (v) analyze each of a pose of the person, a gesture made by the person, and an identity of the person;
  (vi) infer an intent or purpose of the person when approaching an area of danger from the pose of the person, the gesture made by the person, and the identity of the person, each analyzed in (v), and using the trajectory stored in (iii) and monitored in (iv), and (vii) send a machine readable instruction to a security system, depending on the intent or purpose that has been inferred.

38. A device including a computer vision engine wherein the computer vision engine is configured to:
 (i) create a track record for a weapon, the track record defining metadata or parameters for the weapon, in which the track record relates to a person;
 (ii) link that track record to a higher-level track record for a higher-level object, wherein the higher-level object is the person, the higher-level track record including data for trajectory, pose and gesture of the person, in which the link between the respective track records for the weapon and for the higher-level object is established when a probability that the weapon is associated with the higher-level object exceeds a threshold;
 (iii) store the higher level track record in a database;
 (iv) monitor a trajectory of the person using the stored track record of the person;
 (v) analyze each of a pose of the person, a gesture made by the person, and an identity of the person;
 (vi) infer an intent or purpose when approaching an area of danger from the pose of the person, the gesture made by the person, and the identity of the person, each analyzed in (v), and using the trajectory stored in (iii) and monitored in (iv), and
 (vii) send a machine readable instruction to a security system, depending on the intent or purpose that has been inferred;
wherein the device is one of the following products: camera; cloud camera; smart door bell; light switch; garage entry system; non-camera sensor based system; fire alarm sensor or alarm; TV; thermostat; coffee machine; light bulb; music steaming device; fridge; oven; microwave cooker; washing machine; any smart device; any wearable computing device; IoT device,; smartphone; tablet; any portable computing device.

* * * * *